United States Patent
Lomayev et al.

(10) Patent No.: US 10,256,952 B2
(45) Date of Patent: Apr. 9, 2019

(54) APPARATUS, SYSTEM, AND METHOD OF COMMUNICATING A TRANSMISSION ACCORDING TO A SYMBOL BLOCK STRUCTURE AND GUARD INTERVAL (GI) SCHEME

(71) Applicant: INTEL CORPORATION, Santa Clara, CA (US)

(72) Inventors: Artyom Lomayev, Nizhny Novgorod (RU); Iaroslav P. Gagiev, Nizhny Novgorod (RU); Alexander Maltsev, Nizhny Novgorod (RU); Michael Genossar, Modiin (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/392,490

(22) Filed: Dec. 28, 2016

(65) Prior Publication Data

US 2018/0019848 A1 Jan. 18, 2018

Related U.S. Application Data

(60) Provisional application No. 62/362,104, filed on Jul. 14, 2016.

(51) Int. Cl.
*H04L 5/00* (2006.01)
*H04B 7/0413* (2017.01)
(Continued)

(52) U.S. Cl.
CPC ......... *H04L 5/0046* (2013.01); *H04B 7/0413* (2013.01); *H04J 13/0014* (2013.01);
(Continued)

(58) Field of Classification Search
CPC . H04L 1/0618; H04L 1/0625; H04L 27/2602; H04L 27/2626; H04B 7/0413
(Continued)

(56) References Cited

U.S. PATENT DOCUMENTS

| 2011/0110457 A1 | 5/2011 | Lakkis |
| 2015/0043676 A1 | 2/2015 | Zhang |

(Continued)

FOREIGN PATENT DOCUMENTS

| CN | 104836767 | 8/2015 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Leila Malek
(74) *Attorney, Agent, or Firm* — Shichrur & Co.

(57) ABSTRACT

Some demonstrative embodiments include apparatus, system and method of communicating a transmission according to a symbol block structure and Guard Interval (GI) scheme. For example, an apparatus may include logic and circuitry configured to cause a wireless station to generate a plurality of Single Carrier (SC) blocks according to a SC block structure corresponding to a GI type of a plurality of GI types, a SC block of the plurality of SC blocks including a GI followed by a data block, the GI including a Golay sequence having a length based at least on the GI type, a length of the data block is based at least on the GI type; and to transmit a SC transmission over a millimeter Wave (mmWave) frequency band based on the plurality of SC blocks.

22 Claims, 16 Drawing Sheets

(51) Int. Cl.
*H04J 13/00* (2011.01)
*H04L 27/26* (2006.01)

(52) U.S. Cl.
CPC ........ *H04L 5/0007* (2013.01); *H04L 27/2607* (2013.01); *H04L 27/2613* (2013.01); *H04L 27/2636* (2013.01); *H04L 5/0058* (2013.01)

(58) Field of Classification Search
USPC ........................................................ 375/267
See application file for complete search history.

(56) References Cited

U.S. PATENT DOCUMENTS

| 2015/0311962 | A1 | 10/2015 | Maltsev et al. | |
|---|---|---|---|---|
| 2016/0270027 | A1* | 9/2016 | Ang | H04W 68/02 |
| 2016/0330738 | A1* | 11/2016 | Eitan | H04W 72/0446 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Search Report and Written Opinion for PCT/US2017/041645, dated Oct. 19, 2017, 13 pages.

Interdigital Communications et al., 'Discussion on Unique Word DFT-S-OFDM, Waveform for New Radio', R1-165065, 3GPP TSG RAN WG1 Meeting #85, Nanjing, China, May 14, 2016, 4 pages.

International Preliminary Report on Patentability for International Application No. PCT/US2017/041645, dated Jan. 24, 2019, 10 pages.

* cited by examiner $Ga_{64}^i =$ [$Gb_{32}^i$ | $-Ga_{32}^i$]

APPARATUS, SYSTEM, AND METHOD OF COMMUNICATING A TRANSMISSION ACCORDING TO A SYMBOL BLOCK STRUCTURE AND GUARD INTERVAL (GI) SCHEME

CROSS REFERENCE

This Application claims the benefit of and priority from U.S. Provisional Patent Application No. 62/362,104 entitled "APPARATUS, SYSTEM AND METHOD OF COMMUNICATING A TRANSMISSION ACCORDING TO A SYMBOL BLOCK STRUCTURE AND GUARD INTERVAL (GI) SCHEME", filed Jul. 14, 2016, the entire disclosure of which is incorporated herein by reference.

TECHNICAL FIELD

Embodiments described herein generally relate to communicating a transmission according to a symbol block structure and Guard Interval (GI) scheme.

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIGS. 12 and 13 schematically illustrate a plurality of Golay sequences according to a nested property, in accordance with some demonstrative embodiments.

DETAILED DESCRIPTION

Figure 1:
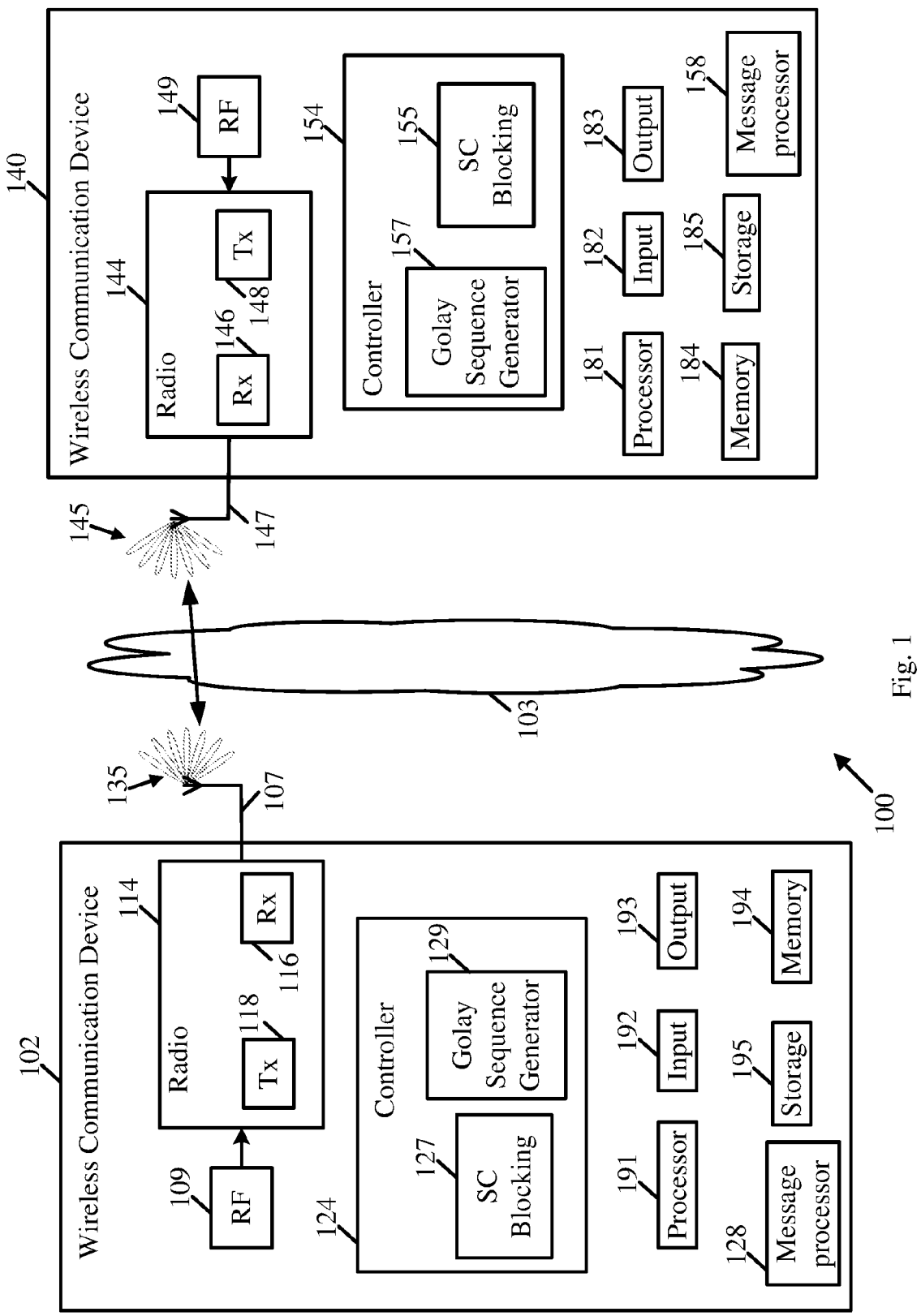
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems—Local and Metropolitan Area Networks Specific Requirements—Part 11: Wireless LAN Medium Access Control (MAC) and Physical Layer (PHY) Specifications—Amendment 4: Enhancements for Very High Throughput for Operation in Bands below 6 GHz"*, December, 2013); *IEEE 802.11ad ("IEEE P802.11ad-2012, IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—Amendment 3: Enhancements for Very High Throughput in the 60 GHz Band"*, 28 December, 2012); *IEEE-802.11REVmc ("IEEE 802.11-REVmc™/D6.0,* June 2016, *draft standard for Information technology—Telecommunications and information exchange between systems Local and metropolitan area networks Specific requirements; Part 11: Wireless LAN Medium Access Control (MAC) and Physical Layer (PHY) Specification"*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment. Enhanced Throughput for Operation in License-Exempt Bands Above* 45 *GHz*)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, April 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, group or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number of rows, and an integer number of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be includes as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be includes as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including, one or more *IEEE* 802.11 *Specifications*, e.g., an *IEEE* 802.11*ad Specification*, an *IEEE* 802.11*REVmc Specification*, an *IEEE* 802.11*ay Specification*, and/or any other specification and/or protocol.

Some demonstrative embodiments may be implemented, for example, as part of a new standard in an mmWave band, e.g., a 60 GHz frequency band or any other directional band, for example, as an evolution of an *IEEE* 802.11*ad Specification*.

In some demonstrative embodiments, devices 102 and/or 140 may be configured according to one or more standards, for example, in accordance with an *IEEE* 802.11*ay Standard*, which may be, for example, configured to enhance the efficiency and/or performance of an *IEEE* 802.11*ad Specification*, which may be configured to provide Wi-Fi connectivity in a 60 GHz band.

Some demonstrative embodiments may enable, for example, to significantly increase the data transmission rates defined in the *IEEE* 802.11*ad Specification*, for example, from 7 Gigabit per second (Gbps), e.g., up to 30 Gbps or more, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate Single Input Single Output (SISO) communications over the mmWave wireless communication band.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an *IEEE 802.11ay Standard* and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

Some wireless communication specifications, for example, the *IEEE 802.11ad-2012 Specification*, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices. For example, device 102 may be configured to transmit a MIMO transmission to one or more devices, e.g., including device 140. In one example, device 102 may transmit a MU-MIMO transmission to a plurality of devices, e.g., including device 140.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

In some demonstrative embodiments, a MU DL MIMO transmission may include a DL transmission from a station, e.g., device 102, to a plurality of stations, e.g., a plurality of stations including device 140, for example, at least partially simultaneously.

In some demonstrative embodiments, a MU UL MIMO transmission may include an UL transmission from a plurality of stations, e.g., including device 140, to a station, e.g., device 102, for example, at least partially simultaneously.

In some demonstrative embodiments, devices 102 and/or 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In some demonstrative embodiments, devices 102 and/or 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, e.g., according to a channel bonding factor of two, a channel BW of 6.48 GHz, e.g., according to a channel bonding factor of four, and/or any other additional or alternative channel BW.

In some demonstrative embodiments, devices 102 and/or 140 may be configured to communicate using a frame structure, which may be configured, for example, for a Single Carrier (SC) Physical layer (PHY) modulation, for example, with frequency domain equalization, e.g., as described below.

In some demonstrative embodiments, devices 102 and/or 140 may be configured to support Single Input Single Output (SISO) transmission, e.g., as described below.

In some demonstrative embodiments, devices 102 and/or 140 may be configured to support Multiple Input Multiple Output (MIMO) transmission, e.g., as described below.

Some communication schemes, for example, in accordance with an *IEEE 802.11ad Specification*, may implement first and second Golay complementary sequences, e.g., the sequences Ga and Gb, to define a Short Training Field (STF) and a Channel Estimation Filed (CEF) of a packet preamble.

Some communication schemes, for example, in accordance with an *IEEE 802.11ad Specification*, may define the Ga sequence of a length of 64 chips e.g., taken at 1.76 Gsps, as a Guard Interval (GI) in a symbol blocking structure, for example, for a SC PHY.

In some demonstrative embodiments, wireless communication stations, e.g., devices 102 and/or 140, may be configured to utilize one or more GIs of a plurality of GI types.

In one example, three types of GI, e.g., including a short GI, a medium GI, and/or a long GI, may be defined, e.g., as described below. In other embodiments, any other number of GI types, e.g., two GI types or more than three GI types, may be defined.

In one example, the plurality of GI types may be implemented by a future *IEEE 802.11 Specification*, e.g., an *IEEE 802.11ay Specification* and/or any other Specification.

In some demonstrative embodiments, the short GI may be implemented, for example, to allow at least solving a technical problem of improving and/or optimizing an overhead of the GI, for example, in case of short-range applications, e.g., "kiosk", where a distance between a transmitter and a receiver may be short enough, which in turn may result in a short channel Power Delay Profile (PDP).

In some demonstrative embodiments, the medium GI may be configured to allow at least solving a technical problem of backward compatibility, for example, to allow compatibility with a legacy IEEE 802.11ad case, for example, where a GI length may be equal to 64 chips, e.g., taken at 1.76 Gsps, and/or equal to 36.36 nanoseconds (ns).

In some demonstrative embodiments, the long GI may be implemented, for example, to allow at least solving a technical problem of large scale environments, which may be introduced, for example, in one or more usage cases of an *IEEE 802.11 ay Specification*, for example, including indoor large hotel lobby, outdoor open area, street canyon, university campus, and the like. For example, the long GI may allow accommodating long channel PDPs corresponding to distances, e.g., of about 100 meters, or even more.

In some demonstrative embodiments, the GI may be defined to support one or more techniques, for example, channel bonding and/or MIMO techniques, e.g., in accordance with an *IEEE 802.11ay Specification*, which may allow, for example, solving at least a technical problem of increasing the transmission data rates.

In some demonstrative embodiments, devices 102 and/or 140 may be configured to generate, process, transmit and/or receive transmissions according to a SC blocking scheme defining SC symbol blocking and/or GI definition, for example, for short, medium, and/or long GI, e.g., as described below.

In some demonstrative embodiments, wireless communication device 102 may include a SC blocking module 127 and/or wireless communication device 140 may include a SC blocking module 155.

In some demonstrative embodiments, controller 124 may include, operate as, and/or perform one or more functionalities of, SC blocking module 127, which may be configured to generate SC blocks for transmission by device 102, for example, according to a SC blocking scheme, and/or to process SC blocks of a transmission to be received by device 102, for example, according to a SC blocking scheme, e.g., as described below.

In some demonstrative embodiments, controller 154 may include, operate as, and/or perform one or more functionalities of, SC blocking module 155, which may be configured to generate SC blocks for transmission by device 140, for example, according to a SC blocking scheme, and/or to process SC blocks of a transmission to be received by device 140, for example, according to a SC blocking scheme, e.g., as described below.

In some demonstrative embodiments, SC blocking module 127 may be implemented as part of a PHY of device 102, e.g., as part of a PHY of radio 114, and/or SC blocking module 155 may be implemented as part of a PHY of device 140, e.g., as part of a PHY of radio 144. In other embodiments, SC blocking module 127 may be implemented as part of any other element of device 102; and/or SC blocking module 155 may be implemented as part of any other element of device 140.

In some demonstrative embodiments, the SC blocking scheme may be configured, for example, to support at least channel bonding and/or MIMO techniques for SC PHY, e.g., which may be implemented for an *IEEE 802.11 ay Specification*.

In some demonstrative embodiments, a GI may be defined using a Golay sequence, e.g., a Ga Golay sequence, of a length N, e.g., as described below.

In some demonstrative embodiments, controller 124 may include, operate as, and/or perform one or more functionalities of, a Golay sequence generator 129 configured to generate one or more Golay sequences, for example, for one or more GIs, e.g., as described below.

In some demonstrative embodiments, controller 154 may include, operate as, and/or perform one or more functionalities of, a Golay sequence generator 157 configured to generate one or more Golay sequences, for example, for one or more GIs, e.g., as described below.

In some demonstrative embodiments, the length N may depend, for example, at least on the GI type, and/or a channel bonding factor, e.g., as described below.

In some demonstrative embodiments, for example, for a MIMO scheme, different GIs may be defined for different streams of a MIMO transmission, for example, for different space-time and/or spatial streams, e.g., as described below.

Figure 2:
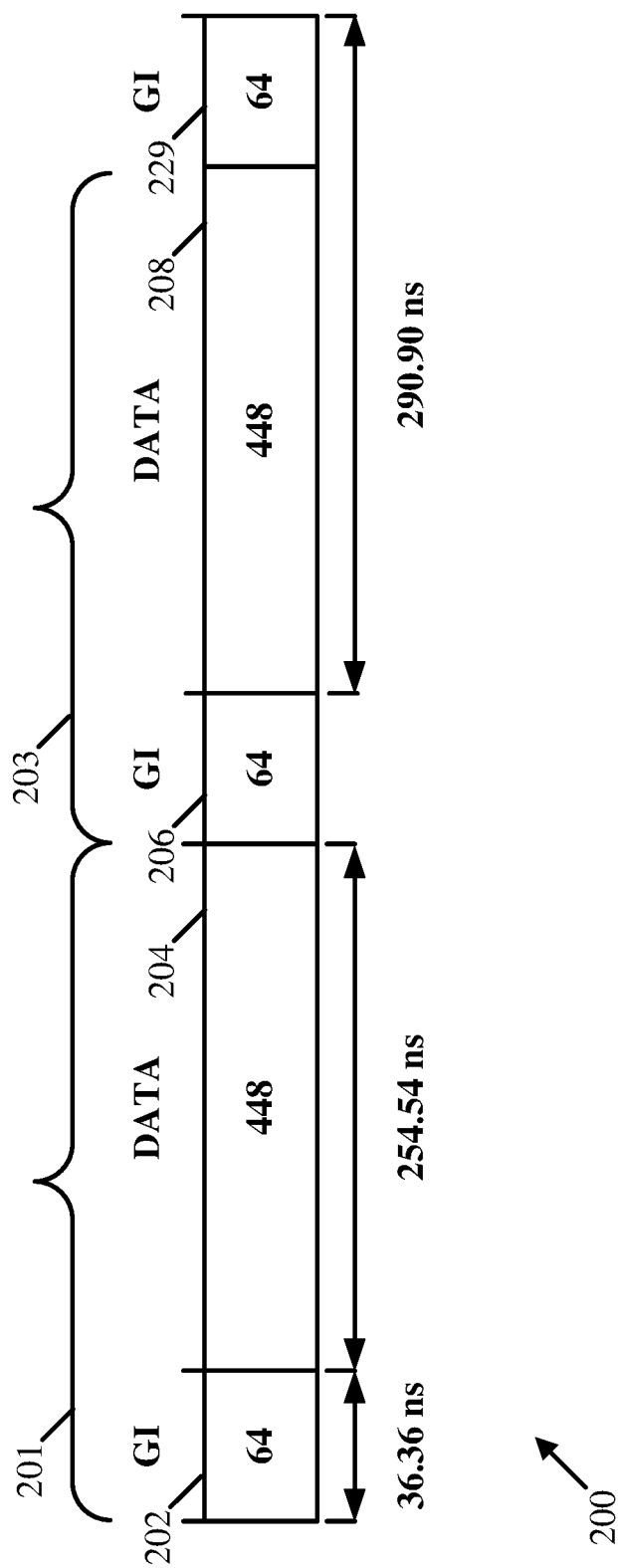
FIG. 2 is a schematic illustration of symbol block structure including a Guard Interval (GI) with a length of 64 samples, which may be implemented as part of blocking scheme, in accordance with some demonstrative embodiments.

Reference is made to FIG. 2, which schematically illustrates a symbol block structure 200 including a Guard Interval (GI) with a length of 64 samples, which may be implemented as part of blocking scheme, in accordance with some demonstrative embodiments.

In some demonstrative embodiments, the symbol block structure 200 may be compatible with a symbol block structure implemented for communication over a directional band, e.g., in accordance with an IEEE 802.11ad Specification. The symbol block structure of FIG. 2 depicts the structure of two SC symbol blocks, e.g., a SC symbol block 201 followed by a SC block 203.

In some demonstrative embodiments, as shown in FIG. 2, the symbol block structure 200 may include a symbol blocking structure in time domain, for example, in which an input flow of a mapper of constellation points is divided into blocks of a length 448 chips (samples).

For example, as shown in FIG. 2, each data block may be prepended with a GI of 64 chips. For example, a data block 204 may be prepended with a GI 202, and a data block 208 may be prepended with a GI 206.

In some demonstrative embodiments, the GI 202 and/or the GI 206 may be defined, for example, based on a $Ga_{64}$ Golay sequence, for example, based on a product of the $Ga_{64}$ Golay sequence multiplied by the exponent $exp(j\pi/2*n)$, where n=0, 1, . . . , 63 is a chip time index.

In some demonstrative embodiments, as shown in FIG. 2, an extra GI repetition 229 may be appended at the very end of the chain of SC symbol blocks.

In some demonstrative embodiments, the introduction of the GIs to the SC block structure 200 may, for example, create a cyclic prefix, which may allow implementing SC demodulation with frequency domain equalization.

In some demonstrative embodiments, the introduction of the GIs to the SC block structure 200 may, for example, enable a receiver of a transmission to use the known $Ga_{64}$ sequence, for example, as a pilot sequence, e.g., for different types of estimations and tracking.

In some demonstrative embodiments, Golay sequence generator 129 (FIG. 1) and/or Golay sequence generator 157 may be configured to generate the $Ga_{64}$ sequence, for example, in accordance with an IEEE 802.11ad Specification and/or any other Specification, for example, while one or more parameters of the Golay generator, for example, a delay vector, denoted Dk, and/or a weight vector, denoted Wk, may be defined differently. The pair of vectors (Dk, Wk) may for example, fully define the output sequence $Ga_{64}$.

In one example, the $Ga_{64}$ sequence may be defined based on the following Dk and Wk vectors:

1. Delay vector: Dk=[2 1 4 8 16 32];
2. Weight vector: Wk=[+1,+1,−1,−1,+1,−1].

Referring back to FIG. 1, in some demonstrative embodiments, devices 102 and/or 140 may be configured to generate, process, transmit and/or receive a SISO transmission according to a SC symbol block structure and GI definition, for example, using one or more different types of GIs and/or a bonding factor, e.g., as described below.

In some demonstrative embodiments, devices 102 and/or 140 may be configured to implement one or more of three types of GIs, e.g., as described below. In other embodiments, one or more additional or alternative GI types may be implemented.

In some demonstrative embodiments, SC blocking module 127 may be configured to generate a plurality of SC blocks according to a SC block structure corresponding to a GI type of a plurality of GI types, e.g., as described below.

In some demonstrative embodiments, SC blocking module 157 may be configured to process a plurality of SC blocks of a received transmission according to a SC block structure corresponding to a GI type of a plurality of GI types, e.g., as described below.

In some demonstrative embodiments, a SC block of the plurality of SC blocks may include a GI followed by a data block, e.g., as described below.

In some demonstrative embodiments, the GI may include a Golay sequence having a length based at least on the GI type, and/or a length of the data block may be based at least on the GI type, e.g., as described below.

In some demonstrative embodiments, each of the plurality of SC block structures may be configured to have a same block size, for example, a block size of 512 samples, or any other block size, e.g., as described below.

In some demonstrative embodiments, controller 124 may be configured to cause, trigger and/or control device 102 to transmit a SC transmission over a mmWave frequency band based on the plurality of SC blocks, e.g., as described below.

In some demonstrative embodiments, the SC transmission may include a SISO transmission, e.g., as described below.

In some demonstrative embodiments, the SC transmission may include a MIMO transmission, e.g., as described below.

In some demonstrative embodiments, controller 154 may be configured to cause, trigger and/or control device 140 to process a received SC transmission over a mmWave frequency band, e.g., the SC transmission from device 102, based on the plurality of SC blocks, e.g., as described below.

In some demonstrative embodiments, SC blocking module 155 may be configured to process the data of the plurality of SC blocks according to the SC block structure corresponding to the GI type of the plurality of GI types, e.g., as described below.

In some demonstrative embodiments, the plurality of GI types may include, for example, at least a long GI, a medium GI, and/or a short GI, e.g., as described below.

In some demonstrative embodiments, a medium GI may have a length of 64 chips (samples), a short GI may have a length 32 chips (samples), and/or a long GI may have a length of 128 chips (samples). In other embodiments, one or more additional or alternative lengths may be used for one or more types of GIs.

In some demonstrative embodiments, the short, medium and/or long GIs may be defined based on Golay sequences, e.g., Ga Golay sequences, of an appropriate length, for example, the short GI may be defined based on the Golay sequence $Ga_{32}$, the medium GI may be defined based on the Golay sequence $Ga_{64}$, and/or the long GI may be defined based on the Golay sequence $Ga_{128}$, e.g., as described below. In other embodiments, the short, medium and/or long GIs may be defined based on any other Golay sequences.

In some demonstrative embodiments, any other additional or alternative GI types and/or GI lengths may be implemented.

In some demonstrative embodiments, a length of the data block in a SC block may be determined based on the GI type, e.g., as described below.

In some demonstrative embodiments, for example, for the medium GI, a length of the data block in the SC symbol block may be 448 chips, for example, for a SC symbol block having a length of 512 chips (samples), e.g., as described above with reference to FIG. 2.

In some demonstrative embodiments, for example, for the short GI, a length of the data block in the SC symbol block may be extended to 480 chips, for example, for a SC symbol block having a length of 512 chips (samples), e.g., as described below.

In some demonstrative embodiments, for example, for the long GI, a length of the data block in the SC symbol block may be reduced to 384 chips, for example, for a SC symbol block having a length of 512 chips (samples), e.g., as described below.

In some demonstrative embodiments, a SC block including a GI length of 32 samples (chips), e.g., $N_{GI}=32$, and a SC symbol block length of data, e.g., $N_{DATA}=480$, may be defined for a first GI type, e.g., the short GI type, e.g., as described below.

In some demonstrative embodiments, a SC block including a GI length of 64 samples (chips), e.g., $N_{GI}=64$, and a SC symbol block length of data, e.g., $N_{DATA}=448$, may be defined for a second GI type, e.g., the medium GI type, e.g., as described below.

In some demonstrative embodiments, a SC block including a GI length of 128 samples (chips), e.g., $N_{GI}=128$, and a SC symbol block length of data, e.g., $N_{DATA}=384$, may be defined for a third GI type, e.g., the long GI type, e.g., as described below.

In some demonstrative embodiments, SC blocking module 127 may be configured to generate SC blocks, and/or SC blocking module 155 may be configured to process data of a received transmission, for example, according to a SC block structure, for example, wherein for each of the plurality of GI types, a GI of a first SC block in the block structure has a same length, e.g., as described below.

In some demonstrative embodiments, the first SC block of the SC block structure may include, for example, a GI having a predefined, length, for example, a length of the longest GI of the plurality of GI types, e.g., a length of 128 samples, while subsequent SC blocks following the first SC block may include a GI, which has a length based on the GI type, e.g., as described below.

In some demonstrative embodiments, a SC symbol blocking for different types of GI may be defined, for example, according to a first SC symbol blocking scheme (also referred to as "option 1"), which may be configured to maintain the very first GI as a long GI, e.g., independent of a particular type of the type of GI to be implemented for a SC block. Such a configuration may allow, for example, achieving a technical advantage of aligning Discrete Fourier Transform (DFT) windows, e.g., in case of different types of GI. Such a configuration may allow, for example, achieving a technical advantage of keeping the same time duration between a preamble and a data portion of a frame, which may be beneficial, e.g., from an implementation point of view.

In some demonstrative embodiments, maintaining the very first GI as a long GI may allow, for example, achieving a technical advantage of allowing a Multi User (MU) transmitter to keep the same duration of frames for users with different GI types, e.g., as described below.

Figure 3:
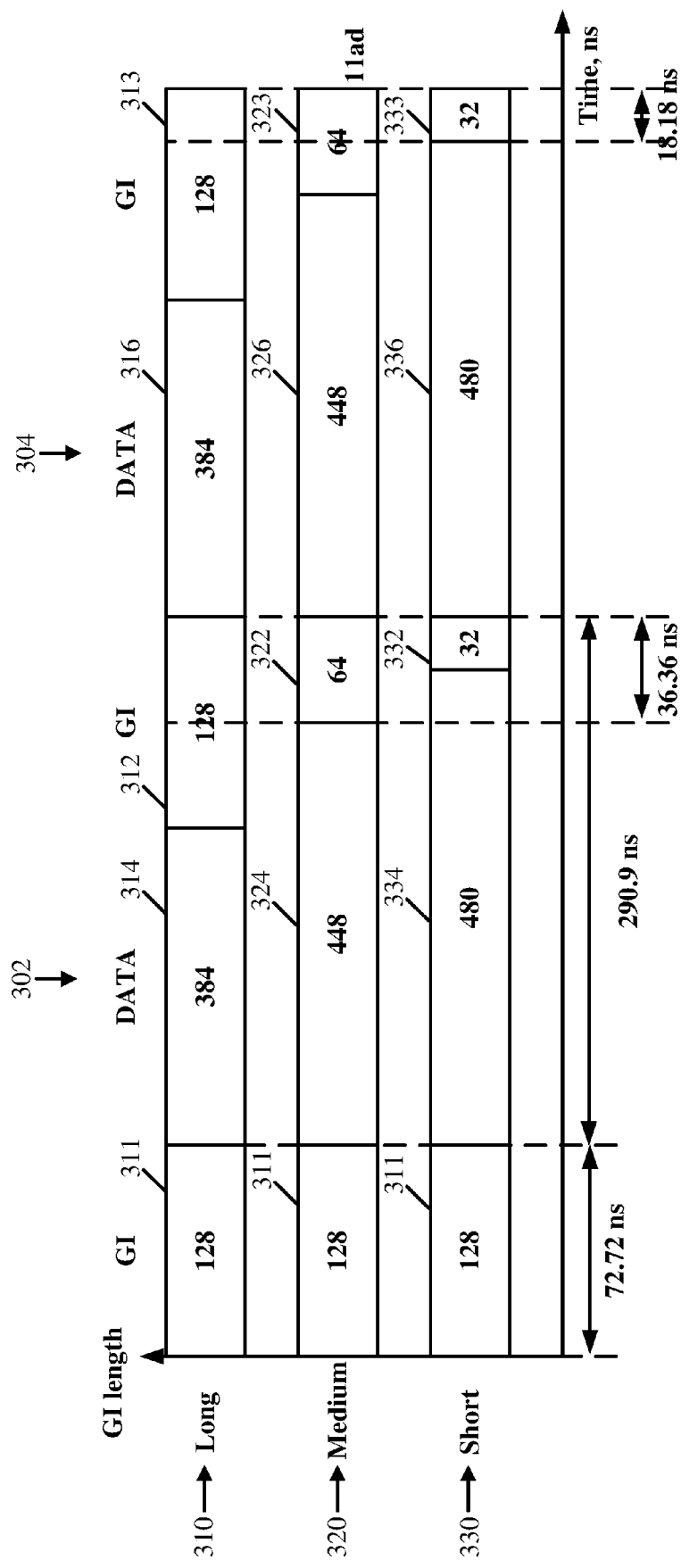
FIG. 3 is a schematic illustration of a blocking scheme defining symbol block structures corresponding to three GI types, in accordance with some demonstrative embodiments.

Reference is made to FIG. 3, which schematically illustrates a blocking scheme 300 defining symbol block structures corresponding to three GI types, in accordance with some demonstrative embodiments. In one example, SC blocking module 127 (FIG. 1) and/or SC blocking module 155 (FIG. 1) may be configured to generate and/or process symbol blocks of one or more transmissions according to blocking scheme 300.

In some demonstrative embodiments, for example, as shown in FIG. 3, blocking scheme 300 may include a first SC block structure 310 corresponding to a first GI type, for example, a long GI, having a length of 128 samples; a second SC block structure 320 corresponding to a second GI type, for example, a medium GI, having a length of 64 samples; and/or a third SC block structure 330 corresponding to a third GI type, for example, a short GI, having a length of 32 samples.

In some demonstrative embodiments, as shown in FIG. 3, a length of a data block of SC block structure 310 may be based on a length of the GI type of SC block structure 310. For example, SC block structure 310 may include a data block of a length of 512−128=384 samples, e.g., corresponding to a SC block length of 512 samples.

In some demonstrative embodiments, as shown in FIG. 3, a length of a data block of SC block structure 320 may be based on a length of the GI type of SC block structure 320. For example, SC block structure 320 may include a data block of a length of 512−64=448 samples, e.g., corresponding to a SC block length of 512 samples.

In some demonstrative embodiments, as shown in FIG. 3, a length of a data block of SC block structure 330 may be based on a length of the GI type of SC block structure 330. For example, SC block structure 330 may include a data block of a length of 512−32=480 samples, e.g., corresponding to a SC block length of 512 samples.

In some demonstrative embodiments, as shown in FIG. 3, blocking scheme 300 may utilize a symbol block structure configured to include a long GI, e.g., based on the $Ga_{128}$, for example, at the beginning of a first SC block 302, for example, for any of the GI types, for example, regardless of whether the symbol block structure is to utilize a short GI, a medium GI or a long GI.

In some demonstrative embodiments, as shown in FIG. 3, a first SC block of SC block structure 310 may include a GI 311 with the length of 128 samples; a first SC block of SC block structure 320 may include the GI 311 with the length of 128 samples; and/or a first SC block of SC block structure 330 may include the GI 311 with the length of 128 samples.

In some demonstrative embodiments, as shown in FIG. 3, the first SC block of block structure 310 may include a SC symbol block 314 including a data block of 384 samples, e.g., following the GI 311.

In some demonstrative embodiments, as shown in FIG. 3, the first SC block of block structure 320 may include a SC symbol block 324 including a data block of 448 samples, e.g., following the GI 311.

In some demonstrative embodiments, as shown in FIG. 3, the first SC block of block structure 330 may include a SC symbol block 334 including a data block of 480 samples, e.g., following the GI 311.

In some demonstrative embodiments, as shown in FIG. 3, a subsequent SC block 304 of SC block structures 310, 320, and/or 330 may include a GI having a length corresponding to the GI type of the SC block structures 310, 320, and/or 330, e.g., as described below.

In some demonstrative embodiments, as shown in FIG. 3, a subsequent 304 of SC block 310 may include a GI 312 with the length of 128 samples, e.g., the long GI; a subsequent SC block 304 of SC block structure 320 may include a GI 322 with the length of 64 samples, e.g., the medium GI; and/or a subsequent SC block 304 of SC block structure 330 may include a GI 332 with the length of 32 samples, e.g., the short GI.

In some demonstrative embodiments, as shown in FIG. 3, the subsequent SC block 304 of block structure 310 may include a SC symbol block 316 including a data block of 384 samples, e.g., following the GI 312.

In some demonstrative embodiments, as shown in FIG. 3, the subsequent SC block 304 of block structure 320 may include a SC symbol block 326 including a data block of 448 samples, e.g., following the GI 322.

In some demonstrative embodiments, as shown in FIG. 3, the subsequent SC block 304 of block structure 330 may include a SC symbol block 336 including a data block of 480 samples, e.g., following the GI 332.

In some demonstrative embodiments, as shown in FIG. 3, a cyclic prefix structure may be maintained unchanged, for example, even for the very first GI and SC block, e.g., due to the following "nested" property:

$Ga_{128}=[Gb_{64}, Ga_{64}]$; and $Ga_{64}=[Gb_{32}, Ga_{32}]$.

Accordingly, as shown in FIG. 3, a second half 313 of the long GI sequence of block structure 310 may coincide with the medium GI sequence 322 of block structure 320, and a second half 323 of the medium GI sequence 312 of block structure 320 may coincide with a short GI sequence 333 of block structure 330.

Referring back to FIG. 1, in some demonstrative embodiments, SC blocking module 127 may be configured to generate SC blocks, and/or SC blocking module 155 may be configured to process data of a received transmission, for example, according to a SC block structure, for example, wherein a first SC block of the SC block structure includes a GI having a length, which is based on the GI type, e.g., as described below.

In some demonstrative embodiments, a SC block structure corresponding to a GI type may use for each SC block a GI having a length which is based on the GI type, e.g., as described below.

In some demonstrative embodiments, a SC symbol blocking for different types of GI may be defined, for example, according to a second SC symbol blocking scheme (also referred to as "option 2"), which may be configured without applying any alignment, for example, by using the very first GI of an appropriate type, e.g., the short GI, the medium GI, or the long GI, e.g., as described below.

Figure 4:
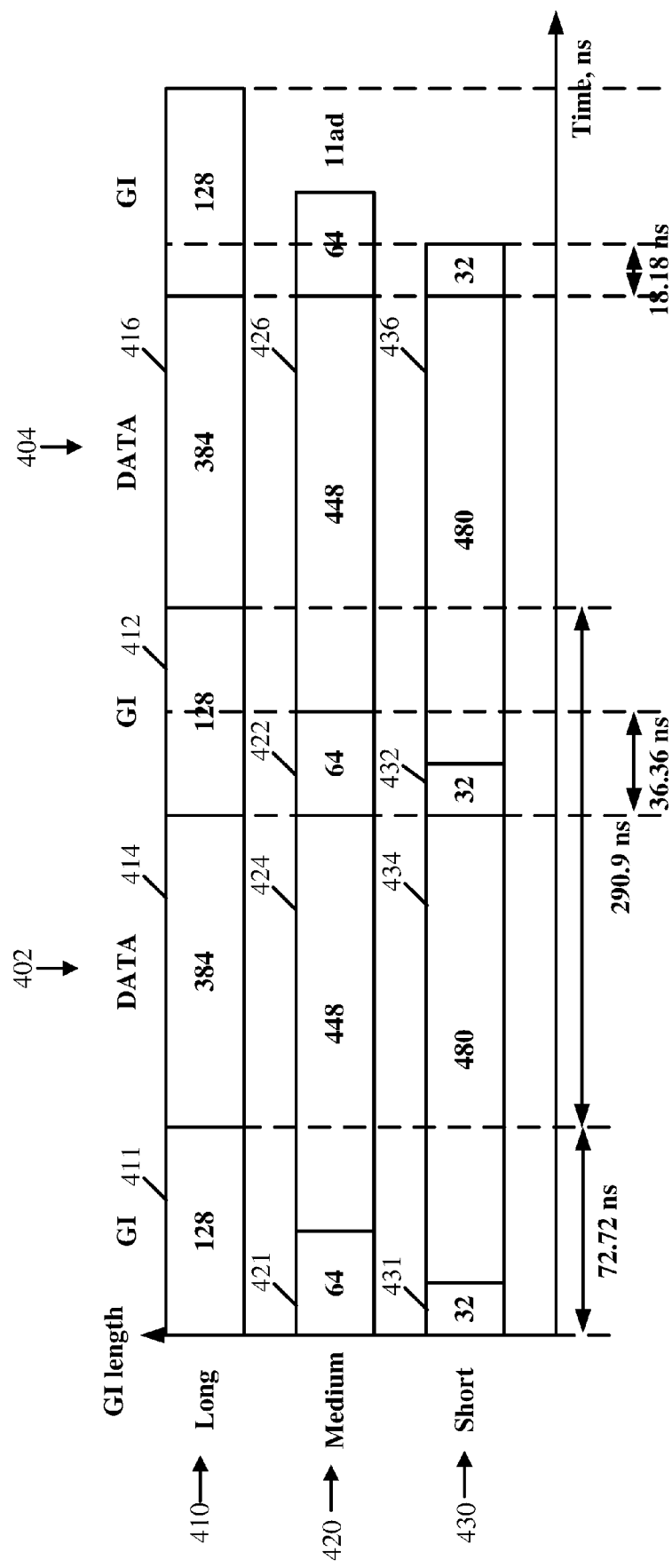
FIG. 4 is a schematic illustration of a blocking scheme defining symbol block structures corresponding to three GI types, in accordance with some demonstrative embodiments.

Reference is made to FIG. 4, which schematically illustrates a blocking scheme 400 defining symbol block structures corresponding to three GI types, in accordance with some demonstrative embodiments. In one example, SC blocking module 127 (FIG. 1) and/or SC blocking module 155 (FIG. 1) may be configured to generate and/or process symbol blocks of one or more transmissions according to blocking scheme 400.

In some demonstrative embodiments, for example, as shown in FIG. 4, blocking scheme 400 may include a first SC block structure 410 corresponding to a first GI type, for example, a long GI, having a length of 128 samples; a second SC block structure 420 corresponding to a second GI type, for example, a medium GI, having a length of 64 samples; and/or a third SC block structure 430 corresponding to a third GI type, for example, a short GI, having a length of 32 samples.

In some demonstrative embodiments, as shown in FIG. 4, a length of a data block of SC block structure 410 may be based on a length of the GI type of SC block structure 410. For example, SC block structure 410 may include a data block of a length of 512−128=384 samples, e.g., corresponding to a SC block length of 512 samples.

In some demonstrative embodiments, as shown in FIG. 4, a length of a data block of SC block structure 420 may be based on a length of the GI type of SC block structure 420. For example, SC block structure 420 may include a data block of a length of 512−64=448 samples, e.g., corresponding to a SC block length of 512 samples.

In some demonstrative embodiments, as shown in FIG. 4, a length of a data block of SC block structure 430 may be based on a length of the GI type of SC block structure 430. For example, SC block structure 430 may include a data block of a length of 512−32=480 samples, e.g., corresponding to a SC block length of 512 samples.

In some demonstrative embodiments, as shown in FIG. 4, blocking scheme 400 may utilize different types of GI for a first GI of symbol block structures 410, 420 and/or 430, e.g., according to the type of GI to be implemented.

In some demonstrative embodiments, as shown in FIG. 4, a first SC block 402 of SC block structure 410 may include a GI 411 with a length corresponding to the long GI type, e.g., 128 samples; a first SC block 402 of SC block structure 420 may include a GI 421 with a length corresponding to the medium GI type, e.g., 64 samples; and/or a first SC block 402 of SC block structure 430 may include a GI 431 with a length corresponding to the short GI type, e.g., 32 samples.

In some demonstrative embodiments, as shown in FIG. 4, the first SC block of block structure 410 may include a SC symbol block 414 including a data block of 384 samples, e.g., following the GI 411.

In some demonstrative embodiments, as shown in FIG. 4, the first SC block of block structure 420 may include a SC symbol block 424 including a data block of 448 samples, e.g., following the GI 421.

In some demonstrative embodiments, as shown in FIG. 4, the first SC block of block structure 430 may include a SC symbol block 434 including a data block of 480 samples, e.g., following the GI 431.

In some demonstrative embodiments, as shown in FIG. 4, a subsequent SC block 404 of SC block structures 410, 420, and/or 430 may also include a GI having a length corresponding to the GI type of the SC block structures 410, 420, and/or 430, e.g., as described below.

In some demonstrative embodiments, as shown in FIG. 4, a subsequent 404 of SC block 410 may include a GI 412 with the length of 128 samples, e.g., the long GI; a subsequent SC block 404 of SC block structure 420 may include a GI 422 with the length of 64 samples, e.g., the medium GI; and/or a subsequent SC block 404 of SC block structure 430 may include a GI 432 with the length of 32 samples, e.g., the short GI.

In some demonstrative embodiments, as shown in FIG. 4, the subsequent SC block 404 of block structure 410 may include a SC symbol block 416 including a data block of 384 samples, e.g., following the GI 412.

In some demonstrative embodiments, as shown in FIG. 4, the subsequent SC block 404 of block structure 420 may include a SC symbol block 426 including a data block of 448 samples, e.g., following the GI 422.

In some demonstrative embodiments, as shown in FIG. 4, the subsequent SC block 404 of block structure 430 may include a SC symbol block 436 including a data block of 480 samples, e.g., following the GI 432.

In some demonstrative embodiments, the SC symbol blocking structure of FIG. 4 may allow, for example, to achieve a technical advantage of reducing an overhead of 64 chips, for example, in case of the medium GI, or 96 chips in case of the short GI, e.g., at an expense of unequal frame length.

Referring back to FIG. 1, in some demonstrative embodiments, SC blocking module 127 may be configured to generate SC blocks, and/or SC blocking module 155 may be configured to process data of a received transmission, for example, according to a SC block structure, for example, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to a plurality of GI types, e.g., as described below.

In some demonstrative embodiments, a SC symbol blocking for different types of GI may be defined, for example, according to a third SC symbol blocking scheme (also referred to as "option 3"), which may be configured to align the centers of the SC symbol blocks and the centers of GIs, e.g., for the different types of GIs, e.g., as described below.

Figure 5:
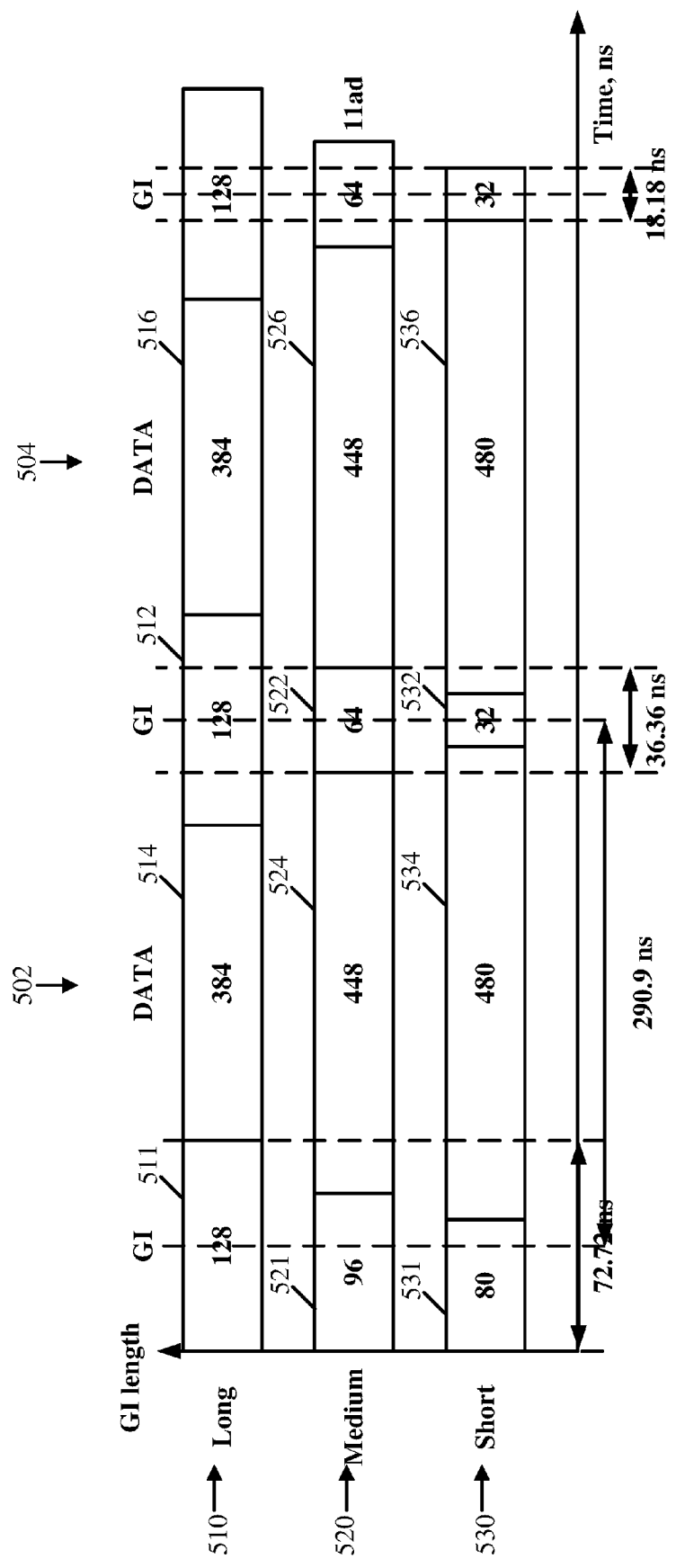
FIG. 5 is a schematic illustration of a blocking scheme defining symbol block structures corresponding to three GI types, in accordance with some demonstrative embodiments.

Reference is made to FIG. 5, which schematically illustrates a blocking scheme 500 defining symbol block structures corresponding to three GI types, in accordance with some demonstrative embodiments. In one example, SC blocking module 127 (FIG. 1) and/or SC blocking module 155 (FIG. 1) may be configured to generate and/or process symbol blocks of one or more transmissions according to blocking scheme 500.

In some demonstrative embodiments, for example, as shown in FIG. 5, blocking scheme 500 may include a first SC block structure 510 corresponding to a first GI type, for example, a long GI, having a length of 128 samples; a second SC block structure 520 corresponding to a second GI type, for example, a medium GI, having a length of 64 samples; and/or a third SC block structure 530 corresponding to a third GI type, for example, a short GI, having a length of 32 samples.

In some demonstrative embodiments, as shown in FIG. 5, a length of a data block of SC block structure 510 may be based on a length of the GI type of SC block structure 510. For example, SC block structure 510 may include a data block of a length of 512−128=384 samples, e.g., corresponding to a SC block length of 512 samples.

In some demonstrative embodiments, as shown in FIG. 5, a length of a data block of SC block structure 520 may be based on a length of the GI type of SC block structure 520. For example, SC block structure 520 may include a data block of a length of 512−64=448 samples, e.g., corresponding to a SC block length of 512 samples.

In some demonstrative embodiments, as shown in FIG. 5, a length of a data block of SC block structure 530 may be based on a length of the GI type of SC block structure 530. For example, SC block structure 530 may include a data block of a length of 512−32=480 samples, e.g., corresponding to a SC block length of 512 samples.

In some demonstrative embodiments, as shown in FIG. 5, blocking scheme 500 may utilize different types of GI for a first GI of symbol block structures 510, 520 and/or 530, e.g., according to the type of GI to be implemented.

In some demonstrative embodiments, a GI of a first SC block in SC block structures 510, 520 and/or 530 may be configured, for example, such that centers of GIs in subsequent SC blocks are aligned between the SC block structures 510, 520 and/or 530, e.g., as described below.

In some demonstrative embodiments, as shown in FIG. 5, a first SC block 502 of SC block structure 510 may include a GI 511 with a length, which is based on the length of long GI type, e.g., 128 samples; a first SC block 502 of SC block structure 520 may include a GI 521 with a length, e.g., 96 samples, which is based on a length of the medium GI type and is configured to align a center of a GI of a subsequent SC block 504 of SC block structure 520 with a center of a GI of a subsequent SC block 504 of SC block structure 510; and/or a first SC block 502 of SC block structure 530 may include a GI 531 with a length, e.g., 80 samples, which is based on a length of the short GI type and is configured to align a center of a GI of a subsequent SC block 504 of SC block structure 530 with a center of a GI of a subsequent SC block 504 of SC block structure 520.

In some demonstrative embodiments, as shown in FIG. 5, the first SC block of block structure 510 may include a SC symbol block 514 including a data block of 384 samples, e.g., following the GI 511.

In some demonstrative embodiments, as shown in FIG. 5, the first SC block of block structure 520 may include a SC symbol block 524 including a data block of 448 samples, e.g., following the GI 521.

In some demonstrative embodiments, as shown in FIG. 5, the first SC block of block structure 530 may include a SC symbol block 534 including a data block of 480 samples, e.g., following the GI 531.

In some demonstrative embodiments, as shown in FIG. 5, the subsequent SC block 504 of SC block structures 510, 520, and/or 530 may also include a GI having a length corresponding to the GI type of the SC block structures 510, 520, and/or 530, e.g., as described below.

In some demonstrative embodiments, as shown in FIG. 5, a subsequent 504 of SC block 510 may include a GI 512 with the length of 128 samples, e.g., the long GI; a subsequent SC block 504 of SC block structure 520 may include a GI 522 with the length of 64 samples, e.g., the medium GI; and/or a subsequent SC block 504 of SC block structure 530 may include a GI 532 with the length of 32 samples, e.g., the short GI.

In some demonstrative embodiments, as shown in FIG. 5, the subsequent SC block 504 of block structure 510 may include a SC symbol block 516 including a data block of 384 samples, e.g., following the GI 512.

In some demonstrative embodiments, as shown in FIG. 5, the subsequent SC block 504 of block structure 520 may include a SC symbol block 526 including a data block of 448 samples, e.g., following the GI 522.

In some demonstrative embodiments, as shown in FIG. 5, the subsequent SC block 504 of block structure 530 may include a SC symbol block 536 including a data block of 480 samples, e.g., following the GI 532.

In some demonstrative embodiments, as shown in FIG. 5, a center of GI 512 of SC block structure 510 may be aligned with a center of GI 522 of block structure 520, and/or the center of GI 522 of SC block structure 520 may be aligned with a center of GI 532 of block structure 530.

In some demonstrative embodiments, this configuration of blocking scheme 500 may provide a technical advantage, for example, with respect to simplifying design and/or implementation.

Referring back to FIG. 1, in some demonstrative embodiments, devices 102 and/or 140 may be configured to utilize a SC symbol block structure, which may be configured to support a plurality of different channel bonding factors, e.g., as described below.

In some demonstrative embodiments, SC blocking module 127 may be configured to generate SC blocks, and/or SC blocking module 155 may be configured to process data of a received transmission according to a channel bonding factor, denoted $N_{CB}$, or example, according to a SC block structure, wherein the length of the GI and the length of the data block may be based on the channel bonding factor, e.g., as described below.

In some demonstrative embodiments, the length of the GI may be determined based on a product of the channel bonding factor and a GI length without channel bonding, e.g., as described below.

In some demonstrative embodiments, the length of the date block may be determined based on a product of the channel bonding factor and a data block length without channel bonding, e.g., as described below.

In some demonstrative embodiments, the channel bonding factor $N_{CB}$ may be, for example, $N_{CB}$=1, 2, 3, or 4. In other embodiments, any other channel bonding factor may be used.

In some demonstrative embodiments, when implementing channel bonding, the length of a SC symbol block may be increased by the channel bonding factor $N_{CB}$, e.g., as described below.

For example, the length of the data block in a SC block to be transmitted with channel bonding, denoted $N_{CB}$ DATA, may be determined, for example, by $N_{CB\ DATA}=N_{DATA}*N_{CB}$, wherein $N_{DATA}$ denotes a length of the data block without channel bonding.

In some demonstrative embodiments, the duration of a symbol block may be maintained unchanged, for example, by decreasing chip duration by the same channel bonding factor $N_{CB}$.

In some demonstrative embodiments, a similar approach may be applied for the GI. For example, the length of the GI may be increased by the channel bonding factor $N_{CB}$ factor.

For example, the length of GI in a SC block to be transmitted with channel bonding, denoted $N_{CB\ GI}$, may be determined, for example, by $N_{CB\ GI}=N_{GI}*N_{CB}$, wherein $N_{GI}$ denotes a length of the GI without channel bonding.

In some demonstrative embodiments, the duration of the GI may be maintained unchanged, for example, by decreasing the chip duration by the same bonding factor $N_{CB}$.

Figure 6:
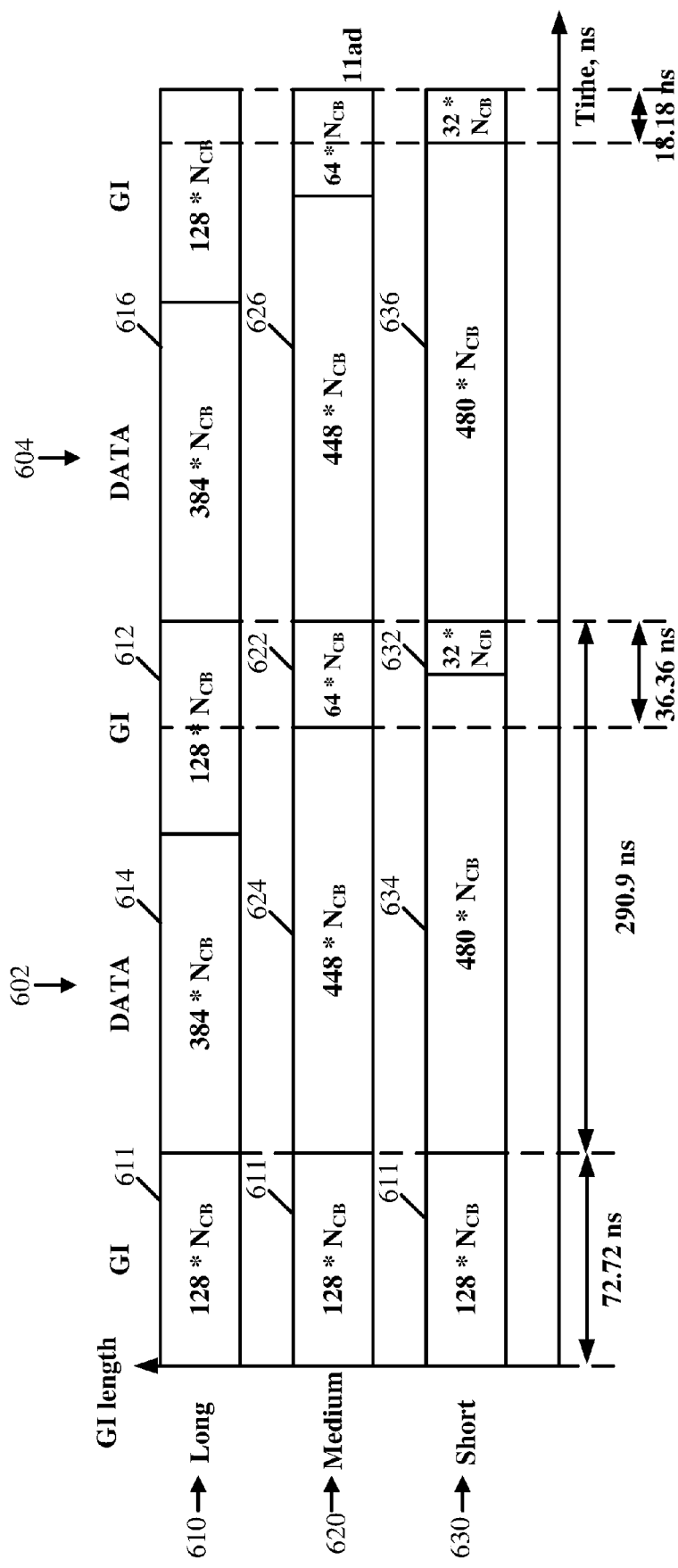
FIG. 6 is a schematic illustration of a blocking scheme defining symbol block structures corresponding to three GI types and a channel bonding factor, in accordance with some demonstrative embodiments.

Reference is made to FIG. 6, which schematically illustrates a blocking scheme 600 defining symbol block structures corresponding to three GI types and the channel bonding factor $N_{CB}$, in accordance with some demonstrative embodiments. In one example, SC blocking module 127 (FIG. 1) and/or SC blocking module 155 (FIG. 1) may be configured to generate and/or process symbol blocks of one or more transmissions according to blocking scheme 600.

In some demonstrative embodiments, as shown in FIG. 6, the SC symbol blocking structures of blocking scheme 600 may be defined for the three different types of GI and based on the channel bonding factor $N_{CB}$, e.g., which may be equal to 1, 2, 3 or 4 or any other factor, e.g., for the option #1.

In some demonstrative embodiments, for example, as shown in FIG. 6, blocking scheme 600 may include a first SC block structure 610 corresponding to a first GI type, for example, a long GI, having a length of 128 samples; a second SC block structure 620 corresponding to a second GI type, for example, a medium GI, having a length of 64 samples; and/or a third SC block structure 630 corresponding to a third GI type, for example, a short GI, having a length of 32 samples.

In some demonstrative embodiments, as shown in FIG. 6, a length of a data block of SC block structure 610 may be based on a length of the GI type of SC block structure 610 and the channel bonding factor $N_{CB}$. For example, SC block structure 610 may include a data block of a length of $(512-128)*N_{CB}=384*N_{CB}$ samples, e.g., corresponding to a SC block length of $512*N_{CB}$ samples.

In some demonstrative embodiments, as shown in FIG. 6, a length of a data block of SC block structure 620 may be based on a length of the GI type of SC block structure 620 and the channel bonding factor $N_{CB}$. For example, SC block structure 620 may include a data block of a length of $(512-64)*N_{CB}=448*N_{CB}$ samples, e.g., corresponding to a SC block length of $512*N_{CB}$ samples.

In some demonstrative embodiments, as shown in FIG. 6, a length of a data block of SC block structure 630 may be based on a length of the GI type of SC block structure 630 and the channel bonding factor $N_{CB}$. For example, SC block structure 630 may include a data block of a length of $(512-32)*N_{CB}=480*N_{CB}$ samples, e.g., corresponding to a SC block length of $512*N_{CB}$ samples.

In some demonstrative embodiments, as shown in FIG. 6, blocking scheme 600 may utilize a symbol block structure configured to include a GI based on the long GI and the channel bonding factor $N_{CB}$, e.g., a GI of a length of $128*N_{CB}$, for example, at the beginning of a first SC block 602, for example, for any of the GI types, for example, regardless of whether the symbol block structure is to utilize a short GI, a medium GI, or a long GI.

In some demonstrative embodiments, as shown in FIG. 6, a first SC block of SC block structure 610 may include a GI 611 with the length of $128*N_{CB}$ samples; a first SC block of SC block structure 620 may include the GI 611 with the length of $128*N_{CB}$ samples; and/or a first SC block of SC block structure 630 may include the GI 611 with the length of $128*N_{CB}$ samples.

In some demonstrative embodiments, as shown in FIG. 6, the first SC block of block structure 610 may include a SC symbol block 614 including a data block of $384*N_{CB}$ samples, e.g., following the GI 611.

In some demonstrative embodiments, as shown in FIG. 6, the first SC block of block structure 620 may include a SC symbol block 624 including a data block of $448*N_{CB}$ samples, e.g., following the GI 611.

In some demonstrative embodiments, as shown in FIG. 6, the first SC block of block structure 630 may include a SC symbol block 634 including a data block of $480*N_{CB}$ samples, e.g., following the GI 611.

In some demonstrative embodiments, as shown in FIG. 6, a subsequent SC block 604 of SC block structures 610, 620, and/or 630 may include a GI having a length corresponding to the GI type of the SC block structures 610, 620, and/or 630, and based on the channel bonding factor $N_{CB}$, e.g., as described below.

In some demonstrative embodiments, as shown in FIG. 6, a subsequent 604 of SC block 610 may include a GI 612 with the length of $128*N_{CB}$ samples, e.g., based on the long GI; a subsequent SC block 604 of SC block structure 620 may include a GI 622 with the length of $64*N_{CB}$ samples, e.g., based on the medium GI; and/or a subsequent SC block 604 of SC block structure 630 may include a GI 632 with the length of $32*N_{CB}$ samples, e.g., based on the short GI.

In some demonstrative embodiments, as shown in FIG. 6, the subsequent SC block 604 of block structure 610 may include a SC symbol block 616 including a data block of $384*N_{CB}$ samples, e.g., following the GI 612.

In some demonstrative embodiments, as shown in FIG. 6, the subsequent SC block 604 of block structure 620 may include a SC symbol block 626 including a data block of $448*N_{CB}$ samples, e.g., following the GI 622.

In some demonstrative embodiments, as shown in FIG. 6, the subsequent SC block 604 of block structure 630 may include a SC symbol block 636 including a data block of $480*N_{CB}$ samples, e.g., following the GI 632.

Figure 7:
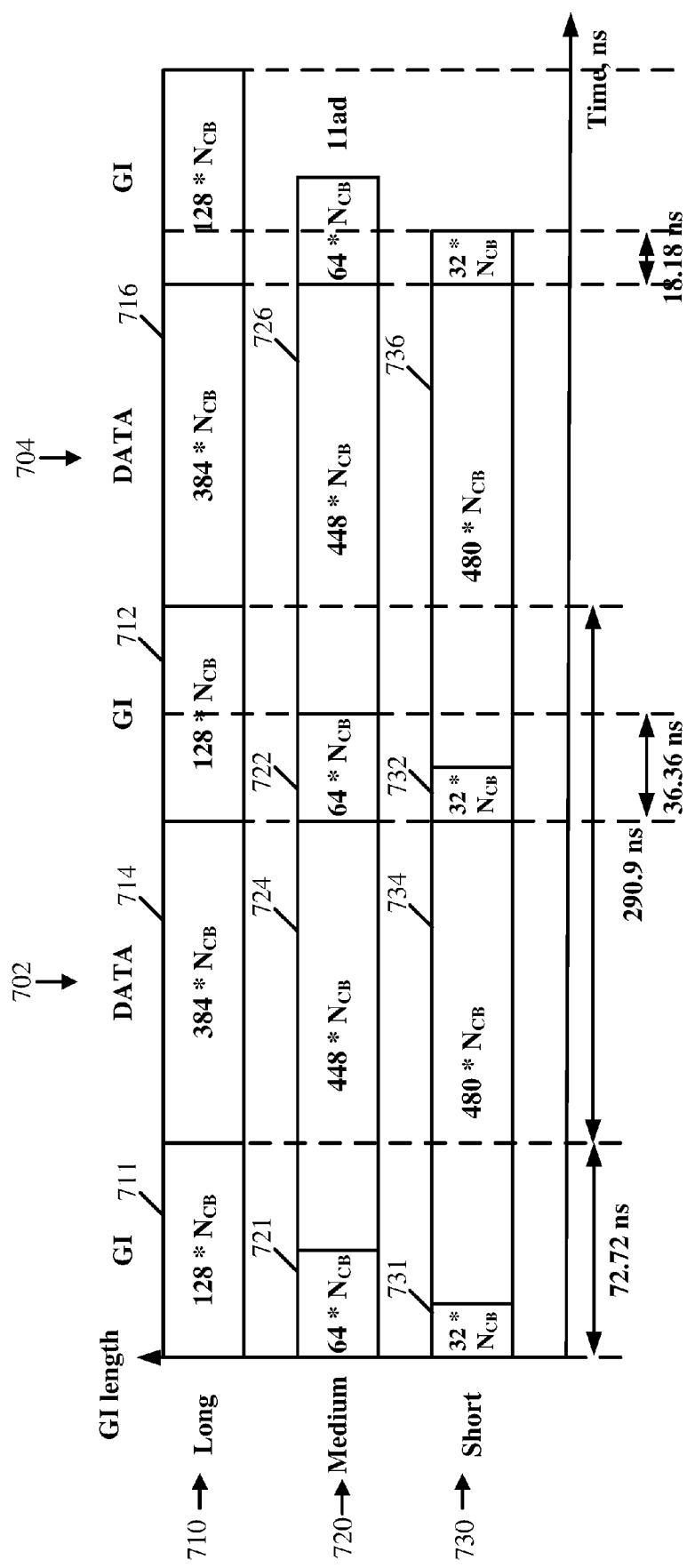
FIG. 7 is a schematic illustration of a blocking scheme defining symbol block structures corresponding to three GI types and a channel bonding factor, in accordance with some demonstrative embodiments.

Reference is made to FIG. 7, which schematically illustrates a blocking scheme 700 defining symbol block structures corresponding to three GI types and the channel bonding factor $N_{CB}$, in accordance with some demonstrative embodiments. In one example, SC blocking module 127 (FIG. 1) and/or SC blocking module 155 (FIG. 1) may be configured to generate and/or process symbol blocks of one or more transmissions according to blocking scheme 700.

In some demonstrative embodiments, as shown in FIG. 7, the SC symbol blocking structures of blocking scheme 700 may be defined for the three different types of GI and based on the channel bonding factor $N_{CB}$, e.g., which may be equal to 1, 2, 3 or 4 or any other factor, e.g., for the option #2.

In some demonstrative embodiments, for example, as shown in FIG. 7, blocking scheme 700 may include a first SC block structure 710 corresponding to a first GI type, for example, a long GI, having a length of 128 samples; a second SC block structure 720 corresponding to a second GI type, for example, a medium GI, having a length of 64 samples; and/or a third SC block structure 730 corresponding to a third GI type, for example, a short GI, having a length of 32 samples.

In some demonstrative embodiments, as shown in FIG. 7, a length of a data block of SC block structure 710 may be based on a length of the GI type of SC block structure 710 and the channel bonding factor $N_{CB}$. For example, SC block structure 710 may include a data block of a length of $(512-128)*N_{CB}$, $384*N_{CB}$ samples, e.g., corresponding to a SC block length of $512*N_{CB}$ samples.

In some demonstrative embodiments, as shown in FIG. 7, a length of a data block of SC block structure 720 may be based on a length of the GI type of SC block structure 720 and the channel bonding factor $N_{CB}$. For example, SC block structure 720 may include a data block of a length of $(512-64)*N_{CB}$, $448*N_{CB}$ samples, e.g., corresponding to a SC block length of $512*N_{CB}$ samples.

In some demonstrative embodiments, as shown in FIG. 7, a length of a data block of SC block structure 730 may be based on a length of the GI type of SC block structure 730 and the channel bonding factor $N_{CB}$. For example, SC block structure 730 may include a data block of a length of (512–32)*$N_{CB}$, 480*$N_{CB}$ samples, e.g., corresponding to a SC block length of 512*$N_{CB}$ samples.

In some demonstrative embodiments, as shown in FIG. 7, blocking scheme 700 may utilize different types of GI for a first GI of symbol block structures 710, 720 and/or 730, e.g., according to the type of GI to be implemented.

In some demonstrative embodiments, as shown in FIG. 7, a first SC block 702 of SC block structure 710 may include a GI 711 with a length of 128*$N_{CB}$ samples, e.g., based on the long GI; a first SC block 702 of SC block structure 720 may include a GI 721 with a length of 64*$N_{CB}$ samples, e.g., based on the medium GI; and/or a first SC block 702 of SC block structure 730 may include a GI 731 with a length of 32*$N_{CB}$ samples, e.g., based on the short GI.

In some demonstrative embodiments, as shown in FIG. 7, the first SC block of block structure 710 may include a SC symbol block 714 including a data block of 384*$N_{CB}$ samples, e.g., following the GI 711.

In some demonstrative embodiments, as shown in FIG. 7, the first SC block of block structure 720 may include a SC symbol block 724 including a data block of 448*$N_{CB}$ samples, e.g., following the GI 721.

In some demonstrative embodiments, as shown in FIG. 7, the first SC block of block structure 730 may include a SC symbol block 734 including a data block of 480*$N_{CB}$ samples, e.g., following the GI 731.

In some demonstrative embodiments, as shown in FIG. 7, a subsequent SC block 704 of SC block structures 710, 720, and/or 730 may also include a GI having a length corresponding to the GI type of the SC block structures 710, 720, and/or 730, e.g., as described below.

In some demonstrative embodiments, as shown in FIG. 7, a subsequent 704 of SC block 710 may include a GI 712 with a length of 128*$N_{CB}$ samples, e.g., based on the long GI; a subsequent SC block 704 of SC block structure 720 may include a GI 722 with a length of 64*$N_{CB}$ samples, e.g., based on the medium GI; and/or a subsequent SC block 704 of SC block structure 730 may include a GI 732 with a length of 32*$N_{CB}$ samples, e.g., based on the short GI.

In some demonstrative embodiments, as shown in FIG. 7, the subsequent SC block 704 of block structure 710 may include a SC symbol block 716 including a data block of 384*$N_{CB}$ samples, e.g., following the GI 712.

In some demonstrative embodiments, as shown in FIG. 7, the subsequent SC block 704 of block structure 720 may include a SC symbol block 726 including a data block of 448*$N_{CB}$ samples, e.g., following the GI 722.

In some demonstrative embodiments, as shown in FIG. 7, the subsequent SC block 704 of block structure 730 may include a SC symbol block 736 including a data block of 480*$N_{CB}$ samples, e.g., following the GI 732.

Figure 8:
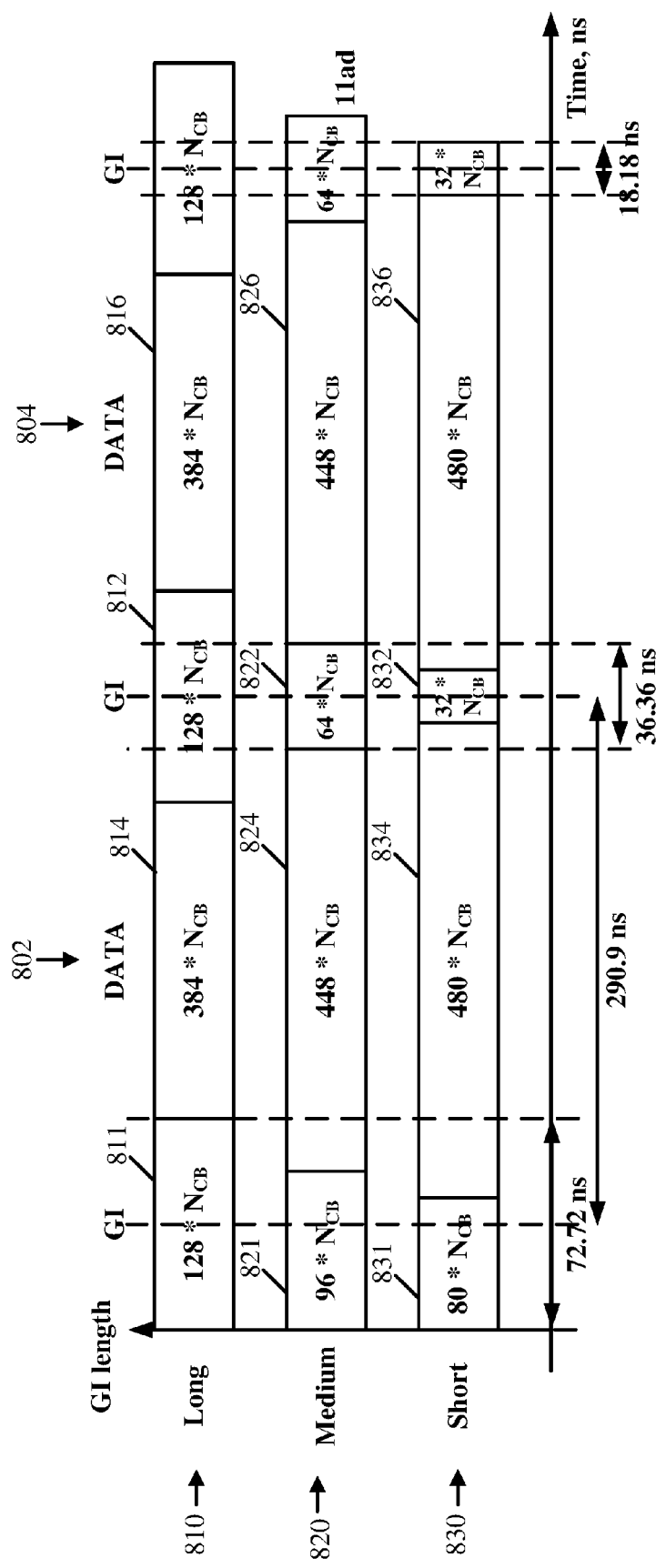
FIG. 8 is a schematic illustration a blocking scheme defining symbol block structures corresponding to three GI types and a channel bonding factor, in accordance with some demonstrative embodiments.

Reference is made to FIG. 8, which schematically illustrates a blocking scheme 800 defining symbol block structures corresponding to three GI types, in accordance with some demonstrative embodiments. In one example, SC blocking module 127 (FIG. 1) and/or SC blocking module 155 (FIG. 1) may be configured to generate and/or process symbol blocks of one or more transmissions according to blocking scheme 800.

In some demonstrative embodiments, as shown in FIG. 8, the SC symbol blocking structures of blocking scheme 800 may be defined for the three different types of GI and based on the channel bonding factor $N_{CB}$, e.g., which may be equal to 1, 2, 3 or 4 or any other factor, e.g., for the option #3.

In some demonstrative embodiments, for example, as shown in FIG. 8, blocking scheme 800 may include a first SC block structure 810 corresponding to a first GI type, for example, a long GI, having a length of 128 samples; a second SC block structure 820 corresponding to a second GI type, for example, a medium GI, having a length of 64 samples; and/or a third SC block structure 830 corresponding to a third GI type, for example, a short GI, having a length of 32 samples.

In some demonstrative embodiments, as shown in FIG. 8, a length of a data block of SC block structure 810 may be based on a length of the GI type of SC block structure 810. For example, SC block structure 810 may include a data block of a length of (512−128)*$N_{CB}$=384*$N_{CB}$ samples, e.g., corresponding to a SC block length of 512*$N_{CB}$ samples.

In some demonstrative embodiments, as shown in FIG. 8, a length of a data block of SC block structure 820 may be based on a length of the GI type of SC block structure 820. For example, SC block structure 820 may include a data block of a length of (512−64)*$N_{CB}$=448*$N_{CB}$ samples, e.g., corresponding to a SC block length of 512*$N_{CB}$ samples.

In some demonstrative embodiments, as shown in FIG. 8, a length of a data block of SC block structure 830 may be based on a length of the GI type of SC block structure 830. For example, SC block structure 830 may include a data block of a length of (512−32)*$N_{CB}$=480*$N_{CB}$ samples, e.g., corresponding to a SC block length of 512*$N_{CB}$ samples.

In some demonstrative embodiments, as shown in FIG. 8, blocking scheme 800 may utilize different types of GI for a first GI of symbol block structures 810, 820 and/or 830, e.g., according to the type of GI to be implemented.

In some demonstrative embodiments, a GI of a first SC block in SC block structures 810, 820 and/or 830 may be configured, for example, such that centers of GIs in subsequent SC blocks are aligned between the SC block structures 810, 820 and/or 830, e.g., as described below.

In some demonstrative embodiments, as shown in FIG. 8, a first SC block 802 of SC block structure 810 may include a GI 811 with a length, which is based on the length of long GI type and the channel bonding factor, e.g., 128*$N_{CB}$ samples; a first SC block 802 of SC block structure 820 may include a GI 821 with a length, e.g., 96*$N_{CB}$ samples, which is based on a length of the medium GI type and the channel bonding factor, and is configured to align a center of a GI of a subsequent SC block 804 of SC block structure 820 with a center of a GI of a subsequent SC block 804 of SC block structure 810; and/or a first SC block 802 of SC block structure 830 may include a GI 831 with a length, e.g., 80*$N_{CB}$ samples, which is based on a length of the short GI type and the channel bonding factor, and is configured to align a center of a GI of a subsequent SC block 804 of SC block structure 830 with a center of a GI of a subsequent SC block 804 of SC block structure 820.

In some demonstrative embodiments, as shown in FIG. 8, the first SC block of block structure 810 may include a SC symbol block 814 including a data block of 384*$N_{CB}$ samples, e.g., following the GI 811.

In some demonstrative embodiments, as shown in FIG. 8, the first SC block of block structure 820 may include a SC symbol block 824 including a data block of 448*$N_{CB}$ samples, e.g., following the GI 821.

In some demonstrative embodiments, as shown in FIG. 8, the first SC block of block structure 830 may include a SC symbol block 834 including a data block of 480*$N_{CB}$ samples, e.g., following the GI 831.

In some demonstrative embodiments, as shown in FIG. 8, the subsequent SC block 804 of SC block structures 810, 820, and/or 830 may also include a GI having a length corresponding to the GI type of the SC block structures 810, 820, and/or 830, e.g., as described below.

In some demonstrative embodiments, as shown in FIG. 8, a subsequent 804 of SC block 810 may include a GI 812 with a length of $128*N_{CB}$ samples, e.g., based on the long GI; a subsequent SC block 804 of SC block structure 820 may include a GI 822 with a length of $64*N_{CB}$ samples, e.g., based on the medium GI; and/or a subsequent SC block 804 of SC block structure 830 may include a GI 832 with a length of $32*N_{CB}$ samples, e.g., based on the short GI.

In some demonstrative embodiments, as shown in FIG. 8, the subsequent SC block 804 of block structure 810 may include a SC symbol block 816 including a data block of $384*N_{CB}$ samples, e.g., following the GI 812.

In some demonstrative embodiments, as shown in FIG. 8, the subsequent SC block 804 of block structure 820 may include a SC symbol block 826 including a data block of $448*N_{CB}$ samples, e.g., following the GI 822.

In some demonstrative embodiments, as shown in FIG. 8, the subsequent SC block 804 of block structure 830 may include a SC symbol block 836 including a data block of $480*N_{CB}$ samples, e.g., following the GI 832.

In some demonstrative embodiments, as shown in FIG. 8, a center of GI 812 of SC block structure 810 may be aligned with a center of GI 822 of block structure 820, and/or the center of GI 822 of SC block structure 820 may be aligned with a center of GI 832 of block structure 830.

Referring back to FIG. 1, in some demonstrative embodiments, devices 102 and/or 140 may be configured to generate, process, transmit and/or receive a MIMO transmission according to a SC symbol block structure and GI definition, for example, using one or more different types of GIs and/or a bonding factor, e.g., as described below.

In some demonstrative embodiments, SC blocking module 127 may be configured to generate a plurality of sequences of SC blocks to be transmitted over a plurality of respective streams of a MIMO transmission, and/or SC blocking module 155 may be configured to process data of one or more streams of a received MIMO transmission, e.g., as described below.

In some demonstrative embodiments, SC blocking module 127 and/or SC blocking module 155 may be configured to generate and/or process the MIMO transmission according a SC block structure, wherein a sequence of SC blocks to be transmitted over a stream may include a GI having a Golay sequence, which is based on a stream number of the stream, e.g., as described below.

In some demonstrative embodiments, SC blocking module 127 and/or SC blocking module 155 may be configured to generate and/or process the MIMO transmission, for example, by utilizing a SC symbol block structure, e.g., as described above with respect to FIGS. 3, 4, 5, 6, 7, and/or 8, for example, for each stream of the MIMO transmission, for example, for each space-time or spatial stream of the MIMO transmission, e.g., as described below.

In some demonstrative embodiments, GIs of different space-time streams of the MIMO transmission may use different Golay sequences, denoted $Ga^i_N$. The index "i" may define an index of a space-time stream, e.g., i=1:NSTS, wherein NSTS denotes a total number of space-time streams of the MIMO transmission. Such a definition may enable, for example, achieving a technical advantage of differentiating between the different streams of the MIMO transmission, for example, to avoid sending the same sequence from different antennas and, therefore, to avoid unintentional beamforming.

Figure 9:
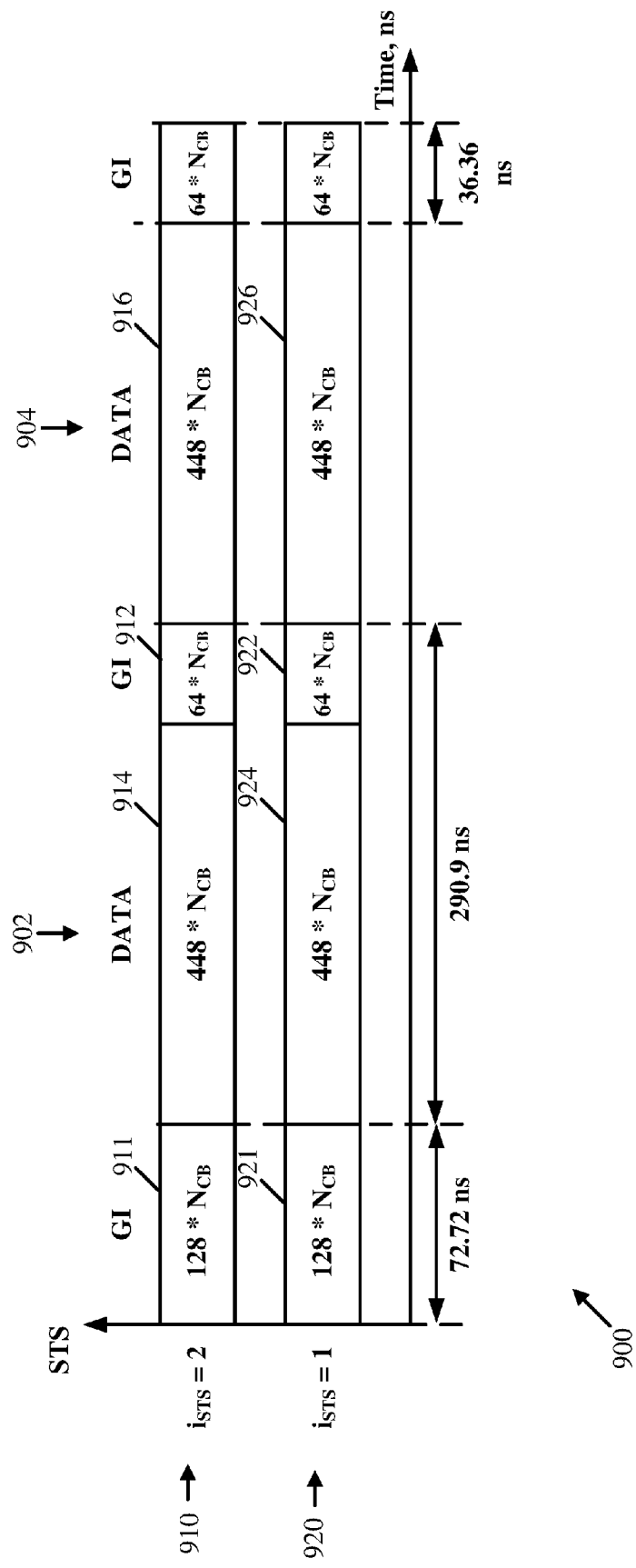
FIG. 9 is a schematic illustration of a symbol block structure corresponding to a Multiple-Input-Multiple-Output (MIMO) transmission, in accordance with some demonstrative embodiments.

Reference is made to FIG. 9, which schematically illustrates a symbol block structure 900 corresponding to a MIMO transmission, in accordance with some demonstrative embodiments. In one example, SC blocking module 127 (FIG. 1) and/or SC blocking module 155 (FIG. 1) may be configured to generate and/or process symbol blocks of one or more MIMO transmissions according to symbol block structure 900.

In some demonstrative embodiments, as shown in FIG. 9, symbol block structure 900 may be configured, for example, with respect to a medium GI type having a GI length 64 chips (samples), and the channel bonding factor $N_{CB}$, e.g., 1, 2, 3, 4, or any other factor, for a MIMO transmission with 2 space-time streams, e.g., based the option #1 discussed above with reference to FIGS. 3 and/or 6.

In some demonstrative embodiments, as shown in FIG. 9, a first stream 920 of the MIMO transmission may have a first stream number $i_{STS}$=1, and a second stream 910 of the MIMO transmission may have a second stream number $i_{STS}$=2.

In some demonstrative embodiments, a first GI sequence, e.g., a GI sequence $Ga^1_{(64*NCB)}$, corresponding to the stream number i=1, and having a length of $64*N_{CB}$ samples, may be utilized for SC blocks of the stream 920; and/or a second GI sequence, e.g., a GI sequence $Ga^2(64*N_{CB})$, corresponding to the stream number i=2, and having a length of $64*N_{CB}$ samples, may be utilized for SC blocks of the stream 910.

In some demonstrative embodiments, as shown in FIG. 9, a length of a data block of SC block structure 900 may be based on a length of the GI type of SC block structure 900 and the channel bonding factor $N_{CB}$. For example, the streams 910 and 920 may include a data block of a length of $(512-64)*N_{CB}=448*N_{CB}$ samples, e.g., corresponding to a SC block length of $512*N_{CB}$ samples.

In some demonstrative embodiments, as shown in FIG. 9, streams 910 and/or 920 may utilize a symbol block structure configured to include a GI based on the long GI and the channel bonding factor $N_{CB}$, e.g., a GI of a length of $128*N_{CB}$, for example, at the beginning of a first SC block 902 of streams 910 and 920.

In some demonstrative embodiments, as shown in FIG. 9, a first SC block 902 of stream 920 may include a GI 921, e.g., a GI sequence $Ga^1_{(128*NCB)}$ corresponding to the stream number i=1, and having a length of $128*N_{CB}$ samples.

In some demonstrative embodiments, as shown in FIG. 9, a first SC block 902 of stream 910 may include a GI 911, e.g., a GI sequence $Ga^2_{(128*NCB)}$ corresponding to the stream number i=2, and having a length of $128*N_{CB}$ samples.

In some demonstrative embodiments, as shown in FIG. 9 the first SC block of stream 910 may include a SC symbol block 914 including a data block of $448*N_{CB}$ samples, e.g., following the GI 911.

In some demonstrative embodiments, as shown in FIG. 9, the first SC block of stream 920 may include a SC symbol block 924 including a data block of $448*N_{CB}$ samples, e.g., following the GI 921.

In some demonstrative embodiments, as shown in FIG. 9, a subsequent SC block 904 of streams 910 and 920 may include a GI having a length of $64*N_{CB}$, e.g., as described below.

In some demonstrative embodiments, as shown in FIG. 9, a subsequent SC block 904 of stream 920 may include a GI 922, e.g., a GI sequence $Ga^1_{(64*NCB)}$ corresponding to the stream number i=1, and having a length of $64*N_{CB}$ samples.

In some demonstrative embodiments, as shown in FIG. 9, a subsequent SC block 904 of stream 910 may include a GI 912, e.g., a GI sequence $Ga^2(64*N_{CB})$ corresponding to the stream number i=2, and having a length of $64*N_{CB}$ samples.

In some demonstrative embodiments, as shown in FIG. 9, the subsequent SC block 904 of stream 910 may include a SC symbol block 916 including a data block of $448*N_{CB}$ samples, e.g., following the GI 912.

In some demonstrative embodiments, as shown in FIG. 9, the subsequent SC block 904 of stream 920 may include a SC symbol block 926 including a data block of $448*N_{CB}$ samples, e.g., following the GI 922.

Referring back to FIG. 1, in some demonstrative embodiments, devices 102 and/or 140 may be configured to generate, process, transmit and/or receive a MIMO transmission according to a SC symbol block structure and GI definition, for example, using GIs of different types in different space-time streams, e.g., as described below.

In some demonstrative embodiments, devices 102 and/or 140 may be configured to generate, process, transmit and/or receive a MIMO transmission according to a SC symbol block structure and GI definition, for example, using a first GI type for a first stream of the MIMO transmission, and a second GI type, different from the first GI type, for a second stream of the MIMO transmission, e.g., as described below.

Figure 10:
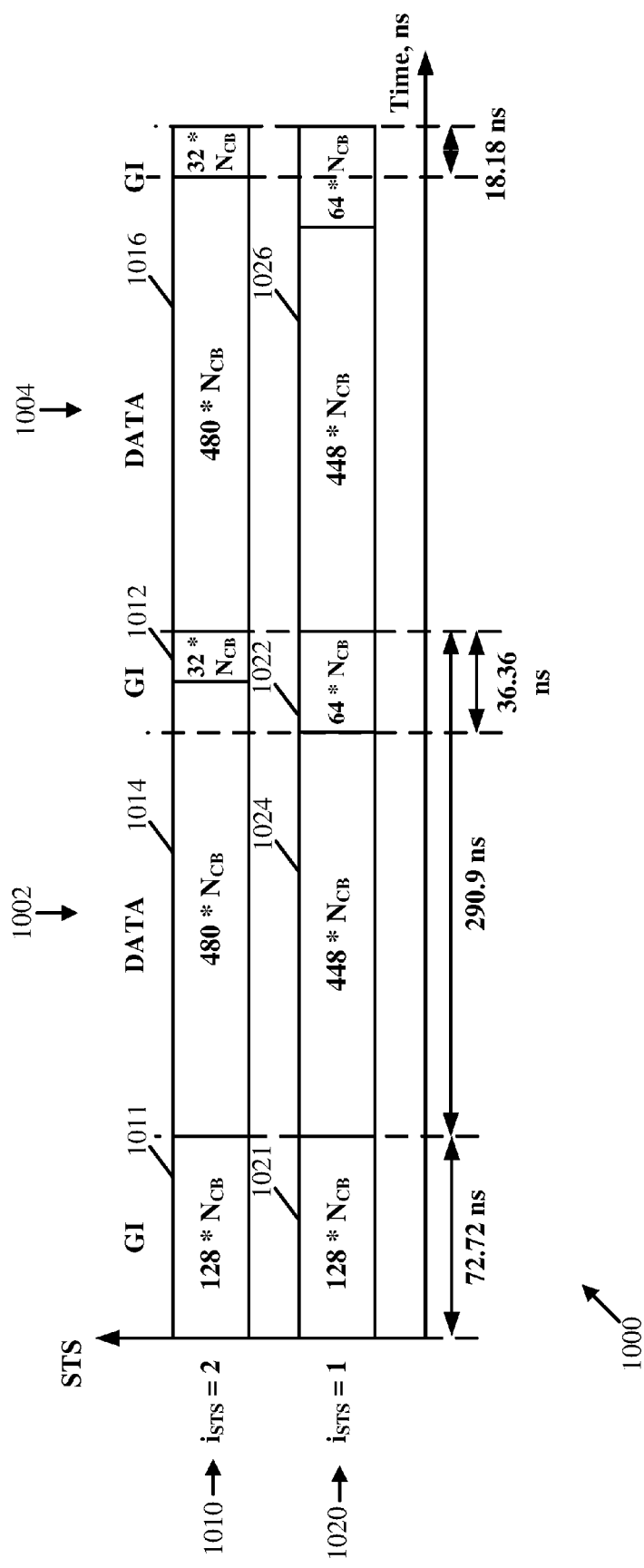
FIG. 10 is a schematic illustration of a symbol block structure corresponding to a MIMO transmission, in accordance with some demonstrative embodiments.

Reference is made to FIG. 10, which schematically illustrates a symbol block structure 1000 corresponding to a MIMO transmission, in accordance with some demonstrative embodiments. In one example, SC blocking module 127 (FIG. 1) and/or SC blocking module 155 (FIG. 1) may be configured to generate and/or process symbol blocks of one or more MIMO transmissions according to symbol block structure 1000.

In some demonstrative embodiments, as shown in FIG. 10, symbol block structure 1000 may be configured, for example, with respect to support a MIMO transmission with 2 space-time streams, wherein two different types of GIs with unequal GI lengths may be applied to the two streams, for example, a medium GI type having a GI length of 64 chips (samples) and a short GI type having a GI length of 32 chips (samples), with the channel bonding factor $N_{CB}$, e.g., 1, 2, 3, 4, or any other factor, for example, based the option #1 discussed above with reference to FIGS. 3 and/or 6.

In some demonstrative embodiments, as shown in FIG. 10, a first stream 1020 of the MIMO transmission may have a first stream number $i_{STS}=1$, and a second stream 1010 of the MIMO transmission may have a second stream number $i_{STS}=2$.

In some demonstrative embodiments, a first GI sequence, e.g., a GI sequence $Ga^1_{(64*NCB)}$, corresponding to the stream number i=1, and having a length of $64*N_{CB}$ samples, may be utilized for SC blocks of the stream 1020; and/or a second GI sequence, e.g., a GI sequence $Ga^2$ $(32*N_{CB})$, corresponding to the stream number i=2, and having a length of $32*N_{CB}$ samples, may be utilized for SC blocks of the stream 1010.

In some demonstrative embodiments, as shown in FIG. 10, a length of a data block of SC block structure 1000 may be based on a length of the GI type of SC block structure 1000 and the channel bonding factor $N_{CB}$. For example, the stream 1020 may include a data block of a length of $(512-64)*N_{CB}=448*N_{CB}$ samples, e.g., corresponding to a SC block length of $512*N_{CB}$ samples. For example, the stream 1010 may include a data block of a length of $(512-32)*N_{CB}=480*N_{CB}$ samples, e.g., corresponding to a SC block length of $512*N_{CB}$ samples.

In some demonstrative embodiments, as shown in FIG. 10, streams 1010 and/or 1020 may utilize a symbol block structure configured to include a GI based on the long GI and the channel bonding factor $N_{CB}$, e.g., a GI of a length of $128*N_{CB}$, for example, at the beginning of a first SC block 1002 of streams 1010 and 1020.

In some demonstrative embodiments, as shown in FIG. 10, a first SC block 1002 of stream 1020 may include a GI 1021, e.g., a GI sequence $Ga^1_{(128*NCB)}$ corresponding to the stream number i=1, and having a length of $128*N_{CB}$ samples.

In some demonstrative embodiments, as shown in FIG. 10, a first SC block 1002 of stream 1010 may include a GI 1011, e.g., a GI sequence $Ga^2_{(128*NCB)}$ corresponding to the stream number i=2, and having a length of $128*N_{CB}$ samples.

In some demonstrative embodiments, as shown in FIG. 10 the first SC block of stream 1010 may include a SC symbol block 1014 including a data block of $480*N_{CB}$ samples, e.g., following the GI 1011.

In some demonstrative embodiments, as shown in FIG. 10, the first SC block of stream 1020 may include a SC symbol block 1024 including a data block of $448*N_{CB}$ samples, e.g., following the GI 1021.

In some demonstrative embodiments, as shown in FIG. 10, a subsequent SC block 1004 of stream 1020 may include a GI having a length of $64*N_{CB}$, e.g., as described below.

In some demonstrative embodiments, as shown in FIG. 10, a subsequent SC block 1004 of stream 1010 may include a GI having a length of $32*N_{CB}$, e.g., as described below.

In some demonstrative embodiments, as shown in FIG. 10, a subsequent SC block 1004 of stream 1020 may include a GI 1022, e.g., a GI sequence $Ga^1_{(64*NCB)}$ corresponding to the stream number i=1, and having a length of $64*N_{CB}$ samples.

In some demonstrative embodiments, as shown in FIG. 10, a subsequent SC block 1004 of stream 1010 may include a GI 1012, e.g., a GI sequence $Ga^2_{(32*NCB)}$ corresponding to the stream number i=2, and having a length of $32*N_{CB}$ samples.

In some demonstrative embodiments, as shown in FIG. 10, the subsequent SC block 1004 of stream 1010 may include a SC symbol block 1016 including a data block of $480*N_{CB}$ samples, e.g., following the GI 1012.

In some demonstrative embodiments, as shown in FIG. 10, the subsequent SC block 1004 of stream 1020 may include a SC symbol block 1026 including a data block of $448*N_{CB}$ samples, e.g., following the GI 1022.

In some demonstrative embodiments, different space-time streams, e.g., the streams 1010 and 1020, may be assigned to different users in a MU-MIMO case. In other embodiments, different space-time streams, e.g., the streams 1010 and 1020, may be assigned to the same user.

Figure 11:
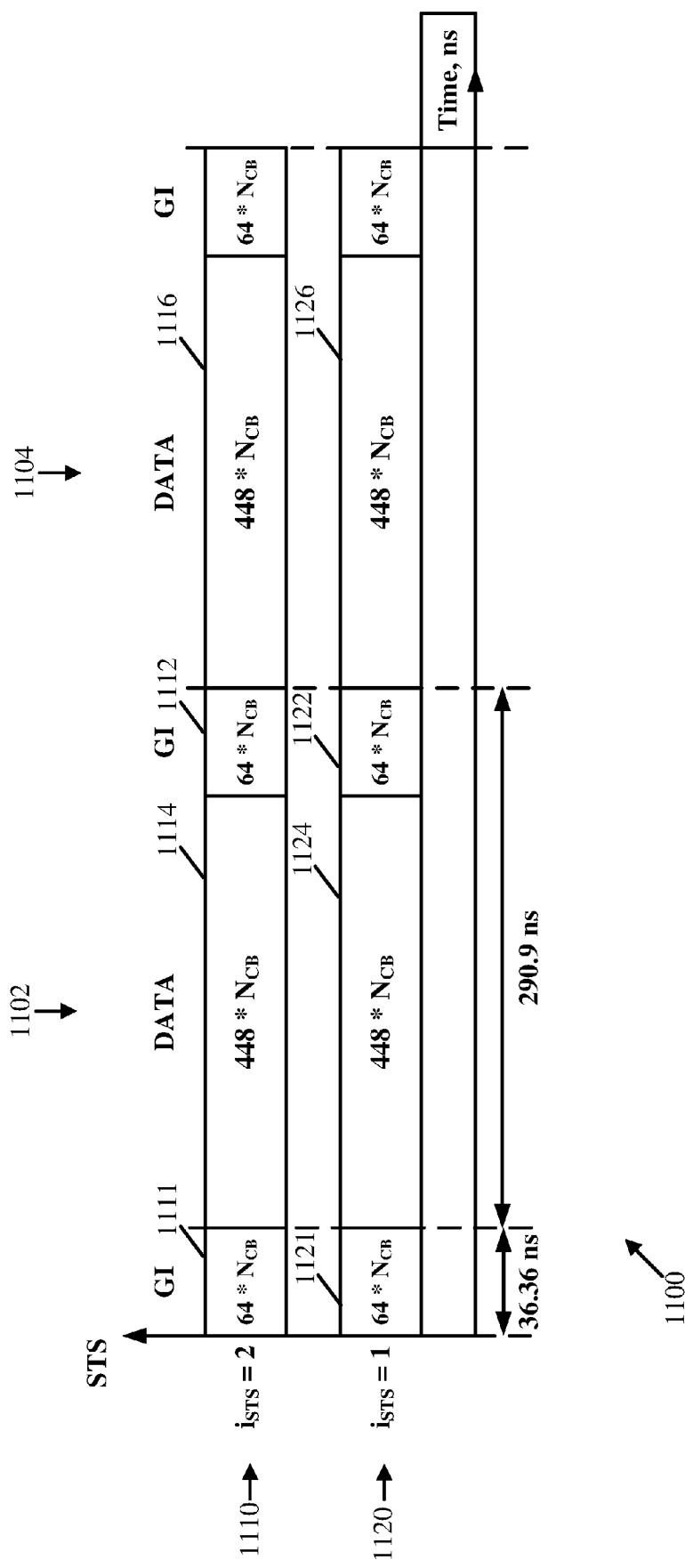
FIG. 11 is a schematic illustration of a symbol block structure corresponding to a MIMO transmission, in accordance with some demonstrative embodiments.

Reference is made to FIG. 11, which schematically illustrates a symbol block structure 1100 corresponding to a MIMO transmission, in accordance with some demonstrative embodiments. In one example, SC blocking module 127 (FIG. 1) and/or SC blocking module 155 (FIG. 1) may be configured to generate and/or process symbol blocks of one or more MIMO transmissions according to symbol block structure 1100.

In some demonstrative embodiments, as shown in FIG. 11, symbol block structure 1100 may be configured, for example, with respect to a medium GI type having a GI length 64 chips (samples), and the channel bonding factor $N_{CB}$, e.g., 1, 2, 3, 4, or any other factor, for a MIMO transmission with 2 space-time streams, e.g., based the option #2 discussed above with reference to FIGS. 4 and/or 7.

In some demonstrative embodiments, as shown in FIG. 11, a first stream 1120 of the MIMO transmission may have a first stream number $i_{STS}=1$, and a second stream 1110 of the MIMO transmission may have a second stream number $i_{STS}=2$.

In some demonstrative embodiments, a first GI sequence, e.g., a GI sequence $Ga^1_{(64*NCB)}$, corresponding to the stream number $i=1$, and having a length of $64*N_{CB}$ samples, may be utilized for SC blocks of the stream 1120; and/or a second GI sequence, e.g., a GI sequence $Ga^2_{(64*NCB)}$, corresponding to the stream number $i=2$, and having a length of $64*N_{CB}$ samples, may be utilized for SC blocks of the stream 1110.

In some demonstrative embodiments, as shown in FIG. 11, a length of a data block of SC block structure 1100 may be based on a length of the GI type of SC block structure 1100 and the channel bonding factor $N_{CB}$. For example, the streams 1110 and 1120 may include a data block of a length of $(512-64)*N_{CB}=448*N_{CB}$ samples, e.g., corresponding to a SC block length of $512*N_{CB}$ samples.

In some demonstrative embodiments, as shown in FIG. 11, streams 1110 and/or 1120 may utilize a symbol block structure configured to include a GI based on the medium GI and the channel bonding factor $N_{CB}$, e.g., a GI of a length of $64*N_{CB}$, for example, at the beginning of a first SC block 1102 of streams 1110 and 1120.

In some demonstrative embodiments, as shown in FIG. 11, a first SC block 1102 of stream 1120 may include a GI 1121, e.g., a GI sequence $Ga^1_{(64*NCB)}$ corresponding to the stream number $i=1$, and having a length of $64*N_{CB}$ samples.

In some demonstrative embodiments, as shown in FIG. 11, a first SC block 1102 of stream 1110 may include a GI 1111, e.g., a GI sequence $Ga^2_{(64*NCB)}$ corresponding to the stream number $i=2$, and having a length of $64*N_{CB}$ samples.

In some demonstrative embodiments, as shown in FIG. 11 the first SC block of stream 1110 may include a SC symbol block 1114 including a data block of $448*N_{CB}$ samples, e.g., following the GI 1111.

In some demonstrative embodiments, as shown in FIG. 11, the first SC block of stream 1120 may include a SC symbol block 1124 including a data block of $448*N_{CB}$ samples, e.g., following the GI 1121.

In some demonstrative embodiments, as shown in FIG. 11, a subsequent SC block 1104 of streams 1110 and 1120 may include a GI having a length of $64*N_{CB}$, e.g., as described below.

In some demonstrative embodiments, as shown in FIG. 11, a subsequent SC block 1104 of stream 1120 may include a GI 1122, e.g., a GI sequence $Ga^1_{(64*NCB)}$ corresponding to the stream number $i=1$, and having a length of $64*N_{CB}$ samples.

In some demonstrative embodiments, as shown in FIG. 11, a subsequent SC block 1104 of stream 1110 may include a GI 1112, e.g., a GI sequence $Ga^2_{(64*NCB)}$ corresponding to the stream number $i=2$, and having a length of $64*N_{CB}$ samples.

In some demonstrative embodiments, as shown in FIG. 11, the subsequent SC block 1104 of stream 1110 may include a SC symbol block 1116 including a data block of $448*N_{CB}$ samples, e.g., following the GI 1112.

In some demonstrative embodiments, as shown in FIG. 11, the subsequent SC block 1104 of stream 1120 may include a SC symbol block 1126 including a data block of $448*N_{CB}$ samples, e.g., following the GI 1122.

In some demonstrative embodiments, the symbol block structures described herein, e.g., with reference to FIGS. 3, 4, 5, 6, 7, 8, 9, 10, and/or 11, may implemented and/or modified with respect to any other additional or alternative type of GI and/or with respect to any other number of space-time streams, e.g., more than two streams.

Referring back to FIG. 1, in some demonstrative embodiments, Golay sequence generator 129 and/or Golay sequence generator 157 may be configured to generate Golay sequences of one or more Golay sequence lengths, for example, for a Golay sequence Ga, which may be defined, for example, to support GI definition for one or more SC block structures, for example, according to the SC blocking schemes described above with reference to FIGS. 3, 4, 5, 6, 7, 8, 9, 10 and/or 11.

In some demonstrative embodiments, one or more Golay sequence lengths may be defined, for example, to support GI definition for channel bonding, for example, with the channel bonding factor $N_{CB}$, e.g., as described below.

In some demonstrative embodiments, Golay sequence generator 129 and/or Golay sequence generator 157 may be configured to generate one or more Golay sequences, denoted $Ga_N$, wherein N denotes a Golay sequence length, e.g., as described below.

In some demonstrative embodiments, Golay sequence generator 129 and/or Golay sequence generator 157 may be configured to generate one or more of the Golay sequences $Ga_{32}$, $Ga_{64}$, $Ga_{96}$, $Ga_{128}$, $Ga_{192}$, $Ga_{256}$, $Ga_{384}$, and/or $Ga_{512}$, for example, to support a Golay sequence length of $N=N_{GI}*N_{CB}$, for example, to support the short, medium, and/or long GI types, for example, with the channel bonding factor $N_{CB}$ of 1, 2, 3, and/or 4.

In some demonstrative embodiments, the Golay sequences of the lengths N=96, N=192, and/or N=384 may be utilized, for example, for processing a GI with a channel bonding factor of $N_{CB}=3$, for example, with respect to the GI lengths of 32, 64, and 128.

In one example, the Golay sequences $Ga_{96}$, $Ga_{192}$, and/or $Ga_{384}$ may be defined, e.g., as follows:

$Ga_{384}=[Gb_{192}, Ga_{192}]$;
$Ga_{192}=[Gb_{96}, Ga_{96}]$; $Gb_{192}=[-Gb_{96}, Ga_{96}]$;
$Ga_{96}=[Gb_{32}, Ga_{64}]$; $Gb_{96}=[-Gb_{32}, Ga_{64}]$.

In some demonstrative embodiments, this definition of the Golay sequences may allow, for example, to satisfy a property that a second half of a longer GI sequence is to coincide with a shorter GI sequence, e.g., as described above with reference to the SC symbol blocking schemes of FIGS. 3 and/or 6.

In some demonstrative embodiments, the Golay sequences $Ga_{32}$, $Ga_{64}$, $Ga_{128}$, $Ga_{256}$, and/or $Ga_{512}$ may be defined, for example, to support a transmission, e.g., a MIMO transmission, for example, for different Golay sequence lengths, e.g., lengths of 32, 64, 128, 256, and/or 512.

In some demonstrative embodiments, the Golay sequences of lengths 96, 192, and 384 may be obtained, for example, from the Golay sequences defined above.

In some demonstrative embodiments, one or more requirements or design rules may be defined to create a set of Golay sequences $Ga^i_N$ corresponding to the stream number i=1:NSTS, e.g., as follows:

1. All sequences $Ga^i_N$ in the set of fixed length N should have the same delay vector Dk for the Golay generator and differ by the weight vector Wk only;
2. The delay vector of a longer Ga sequence may be obtained by direct extension, for example, by adding a new delay and preserving the rest of previous delays;
3. A legacy sequence $Ga_{64}$ may be a part of the set, for example, to provide a consistency to a legacy IEEE 802.11ad Standard;
4. All sequences $Ga^i_N$ in the set may be mutually orthogonal; and/or 5. A "nested" property $Ga^i_N=[Gb^i_{N/2}, Ga^i_{N/2}]$, $Gb^i_N=[-Gb^i_{N/2}, Ga^i_{N/2}]$ may be satisfied for all lengths, for example, to support the aligned symbol structure, e.g., as described above with reference to FIGS. 3 and/or 6.

In some demonstrative embodiments, the delay vector Dk may be defined, for example, based on the Golay sequence length, e.g., as follows:

$Ga^i_{32}$: Dk=[2 1 4 8 16];
$Ga^i_{64}$: Dk=[2 1 4 8 16 32];
$Ga^i_{128}$: Dk=[2 1 4 8 16 32 64];
$Ga^i_{256}$: Dk=[2 1 4 8 16 32 64 128]; and/or
$Ga^i_{512}$: Dk=[2 1 4 8 16 32 64 128 256].

In some demonstrative embodiments, the weight vector Wk may be defined for generation of a Golay sequence length, for example, based on the sequence length N, and the stream number i, e.g., as follows:

TABLE 1

| # | $W_k$ for N = 32 | $W_k$ for N = 64 | $W_k$ for N = 128 | $W_k$ for N = 256 | $W_k$ for N = 512 |
|---|---|---|---|---|---|
| 1 | [1 1 −1 −1 1] | [1 1 −1 −1 1 −1] | [1 1 −1 −1 1 −1 1] | [1 1 −1 −1 1 −1 1 1] | [1 1 −1 −1 1 1 −1 1 1 1] |
| 2 | [1 −1 −1 −1 1] | [1 −1 −1 −1 1 −1] | [1 −1 −1 −1 1 −1 1] | [1 −1 −1 −1 1 −1 1 1] | [1 −1 −1 −1 1 1 −1 1 1 1] |
| 3 | [−1 −1 −1 −1 −1] | [−1 −1 −1 −1 −1 −1] | [−1 −1 −1 −1 −1 −1 1] | [−1 −1 −1 −1 −1 −1 1 1 1] | [−1 −1 −1 −1 −1 −1 1 1 1 1] |
| 4 | [−1 1 −1 −1 −1] | [−1 1 −1 −1 −1 −1] | [−1 1 −1 −1 −1 −1 1 1] | [−1 1 −1 −1 −1 −1 1 1 1] | [1 1 −1 −1 −1 −1 1 1 1 1] |
| 5 | [−1 −1 −1 −1 1] | [−1 −1 −1 −1 1 −1] | [−1 −1 −1 −1 1 −1 1] | [−1 −1 −1 −1 1 −1 1 1 1] | [−1 −1 −1 −1 1 1 −1 1 1 1] |
| 6 | [−1 1 −1 −1 1] | [−1 1 −1 −1 1 −1] | [−1 1 −1 −1 1 −1 1] | [−1 1 −1 −1 1 −1 1 1 1] | [−1 1 −1 −1 1 1 −1 1 1 1] |
| 7 | [−1 −1 −1 1 −1] | [−1 −1 −1 1 −1 −1] | [−1 −1 −1 1 −1 −1 1] | [−1 −1 −1 1 −1 −1 1 1 1] | [−1 −1 −1 1 −1 1 −1 1 1 1] |
| 8 | [−1 1 −1 1 −1] | [−1 1 −1 1 −1 −1] | [−1 1 −1 1 −1 −1 1] | [−1 1 −1 1 −1 −1 1 1 1] | [−1 1 −1 1 −1 1 −1 1 1 1] |
| 9 | [−1 −1 −1 1 1] | [−1 −1 −1 1 1 −1] | [−1 −1 −1 1 1 −1 1] | [−1 −1 −1 1 1 −1 1 1 1] | [−1 −1 −1 1 1 1 −1 1 1 1] |
| 10 | [−1 1 −1 1 1] | [−1 1 −1 1 1 −1] | [−1 1 −1 1 1 −1 1] | [−1 1 −1 1 1 −1 1 1 1] | [−1 1 −1 1 1 1 −1 1 1 1] |
| 11 | [−1 −1 1 −1 −1] | [−1 −1 1 −1 −1 −1] | [−1 −1 1 −1 −1 −1 1] | [−1 −1 1 −1 −1 −1 1 1 1] | [−1 −1 1 −1 −1 1 −1 1 1 1] |
| 12 | [−1 1 1 −1 −1] | [−1 1 1 −1 −1 −1] | [−1 1 1 −1 −1 −1 1] | [−1 1 1 −1 −1 −1 1 1 1] | [−1 1 1 −1 −1 1 −1 1 1 1] |
| 13 | [−1 −1 1 −1 1] | [−1 −1 1 −1 1 −1] | [−1 −1 1 −1 1 −1 1] | [−1 −1 1 −1 1 −1 1 1 1] | [−1 −1 1 −1 1 1 −1 1 1 1] |
| 14 | [−1 1 1 −1 1] | [−1 1 1 −1 1 −1] | [−1 1 1 −1 1 −1 1] | [−1 1 1 −1 1 −1 1 1 1] | [−1 1 1 −1 1 1 −1 1 1 1] |
| 15 | [−1 −1 1 1 −1] | [−1 −1 1 1 −1 −1] | [−1 −1 1 1 −1 −1 1] | [−1 −1 1 1 −1 −1 1 1 1] | [−1 −1 1 1 −1 1 −1 1 1 1] |
| 16 | [−1 1 1 1 −1] | [−1 1 1 1 −1 −1] | [−1 1 1 1 −1 −1 1] | [−1 1 1 1 −1 −1 1 1 1] | [−1 1 1 1 −1 1 −1 1 1 1] |

In some demonstrative embodiments, a maximum number of Golay sequences in the Golay sequence set may be equal to 16, for example, to support a foreseen maximum number of 16 streams in a MU-MIMO case. In other embodiments, any other number of Golay sequences may be sued, e.g., less than 16 or more than 16.

In some demonstrative embodiments, Golay sequences of different lengths may be related, for example, in conformity with a "nested" property described above, for example, with respect to the option #1, e.g., as follows:

TABLE 2

| Length | Ga | Gb |
|---|---|---|
| 64 | $Ga^i_{64} = [Gb^i_{32}, -Ga^i_{32}]$ | $Gb^i_{64} = [-Gb^i_{32}, -Ga^i_{32}]$ |
| 128 | $Ga^i_{128} = [Gb^i_{64}, Ga^i_{64}]$ | $Gb^i_{128} = [-Gb^i_{64}, Ga^i_{64}]$ |
| 256 | $Ga^i_{256} = [Gb^i_{128}, Ga^i_{128}]$ | $Gb^i_{256} = [-Gb^i_{128}, Ga^i_{128}]$ |
| 512 | $Ga^i_{512} = [Gb^i_{256}, Ga^i_{256}]$ | $Gb^i_{512} = [-Gb^i_{256}, Ga^i_{256}]$ |

In some demonstrative embodiments, for example, in case of a GI of length 32 chips, the GI for the i-th space-time stream may be defined as $-Ga^i_{32}$. In all other cases (N≠32), the GI may be defined as $Ga^i_N$.

Figure 12:
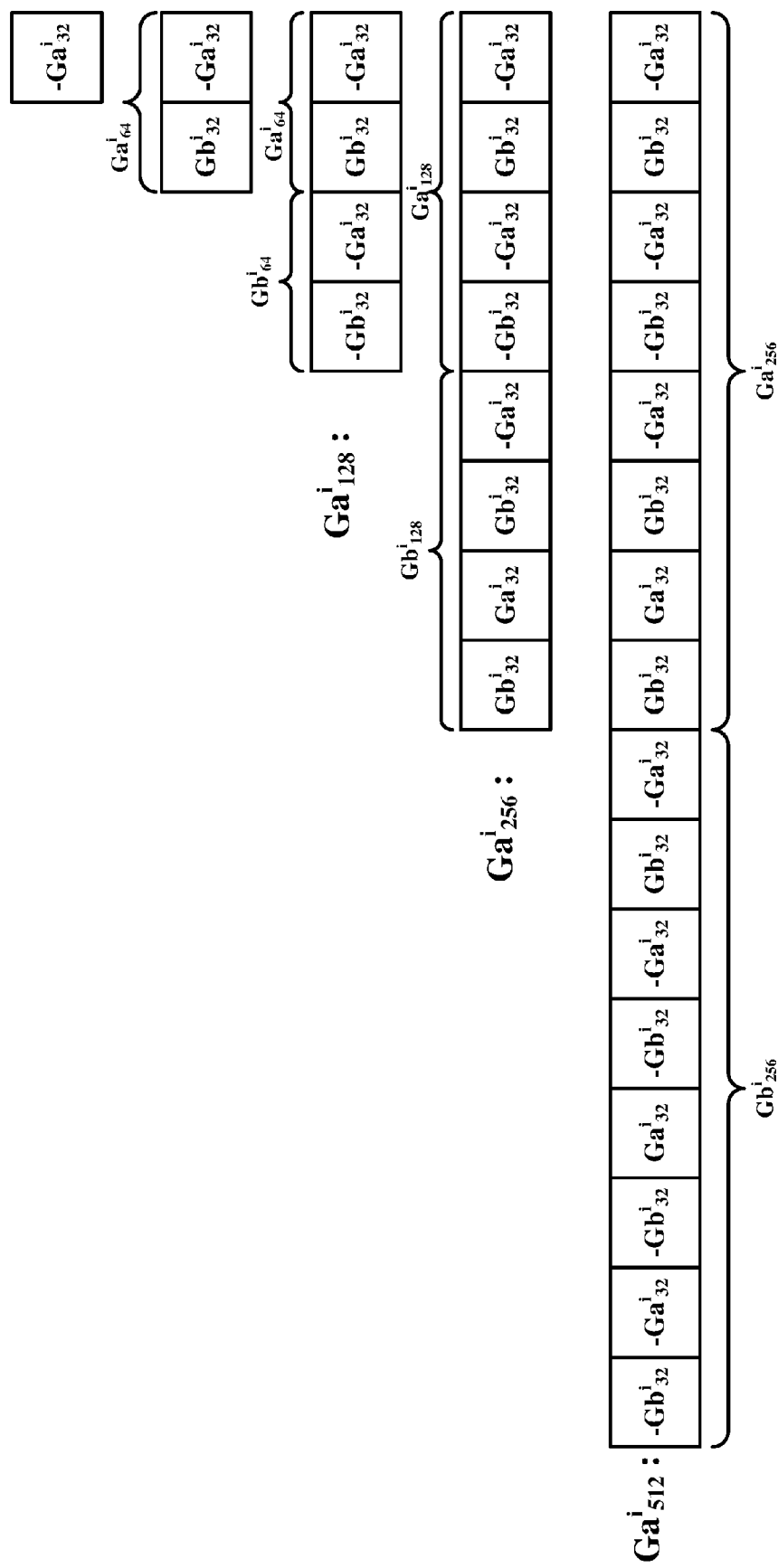
Figure 13:
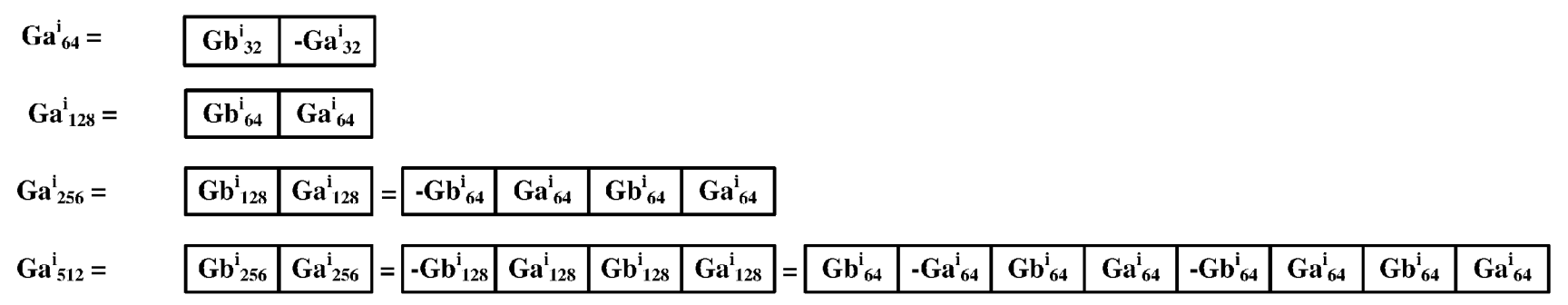

FIGS. 12 and 13 schematically illustrate definitions of the plurality of Golay sequences, for example, according to Table 2, in accordance with some demonstrative embodiments.

Figure 14:
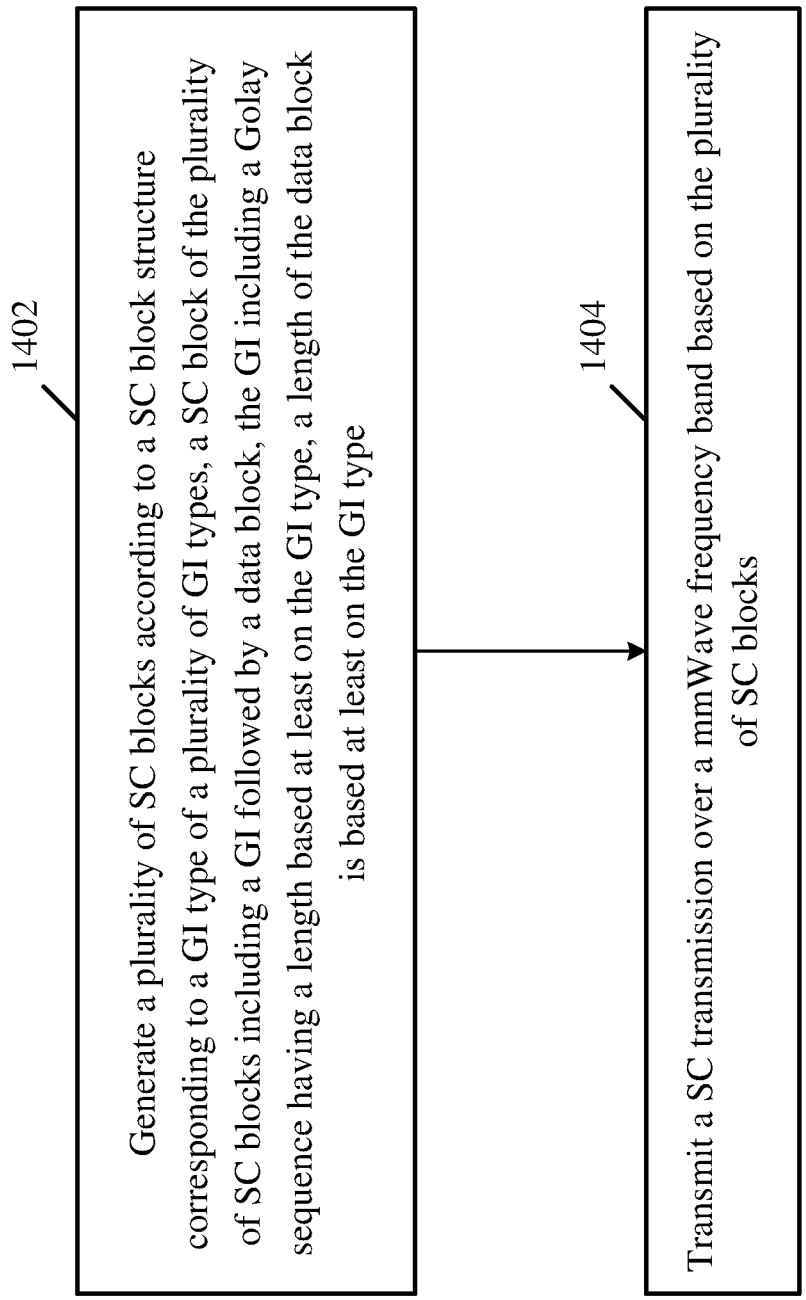
FIG. 14 is a schematic flow-chart illustration of a method of communicating a Single Carrier (SC) transmission, in accordance with some demonstrative embodiments.

Reference is made to FIG. 14, which schematically illustrates a method of communicating a SC transmission, in accordance with some demonstrative embodiments. For example, one or more of the operations of the method of FIG. 14 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a SC blocking module, e.g., SC blocking module 127 and/or SC blocking module 155 (FIG. 1); a Golay sequence generator, e.g., Golay sequence generator 129 (FIG. 1); and/or Golay sequence generator 157 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 1402, the method may include generating a plurality of SC blocks according to a SC block structure corresponding to a GI type of a plurality of GI types, a SC block of the plurality of SC blocks including a GI followed by a data block, the GI including a Golay sequence having a length based at least on the GI type, a length of the data block is based at least on the GI type. For example, SC blocking module 127 (FIG. 1) may generate a plurality of SC blocks according to a SC block structure corresponding to a GI type of a plurality of GI types, a SC block of the plurality of SC blocks including a GI followed by a data block, the GI including a Golay sequence having a length based at least on the GI type, a length of the data block is based at least on the GI type, e.g., as described above.

As indicated at block 1404, the method may include transmitting a SC transmission over an mmWave frequency band based on the plurality of SC blocks. For example, controller 124 (FIG. 1) may cause the wireless station implemented by device 102 (FIG. 1) to transmit a SC transmission over a mmWave frequency band based on the plurality of SC blocks, e.g., as described above.

Figure 15:
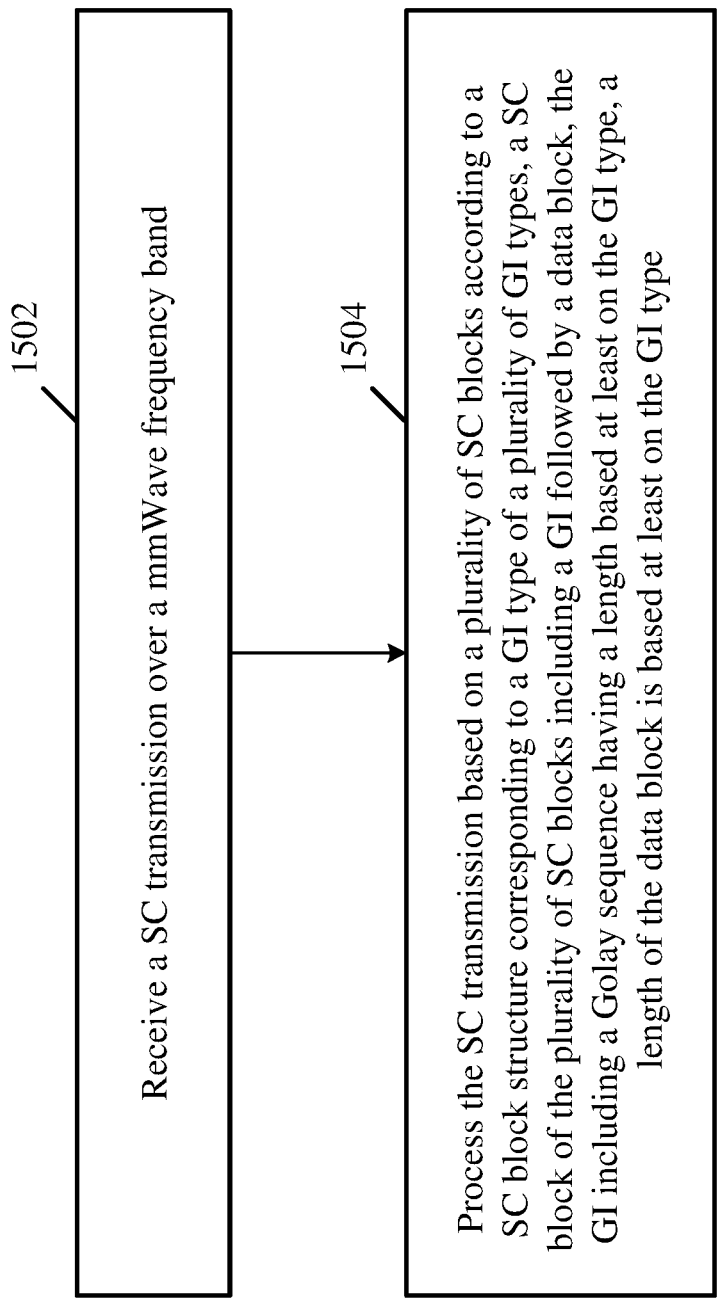
FIG. 15 is a schematic flow-chart illustration of a method of communicating a SC transmission, in accordance with some demonstrative embodiments.

Reference is made to FIG. 15, which schematically illustrates a method of communicating a SC transmission, in accordance with some demonstrative embodiments. For example, one or more of the operations of the method of FIG. 15 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a SC blocking module, e.g., SC blocking module 127 and/or SC blocking module 155 (FIG. 1); a Golay sequence generator, e.g., Golay sequence generator 129 (FIG. 1); and/or Golay sequence generator 157 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 1502, the method may include receiving a SC transmission over an mmWave frequency band. For example, controller 154 (FIG. 1) may cause the wireless station implemented by device 140 (FIG. 1) to receive a SC transmission over an mmWave frequency band based, e.g., as described above.

As indicated at block 1504, the method may include processing the SC transmission based on a plurality of SC blocks according to a SC block structure corresponding to a GI type of a plurality of GI types, a SC block of the plurality of SC blocks including a GI followed by a data block, the GI including a Golay sequence having a length based at least on the GI type, a length of the data block is based at least on the GI type. For example, controller 154 (FIG. 1) may cause the wireless station implemented by device 140 (FIG. 1) to process the SC transmission based on a plurality of SC blocks according to the SC block structure corresponding to the GI type, e.g., as described above.

Figure 16:
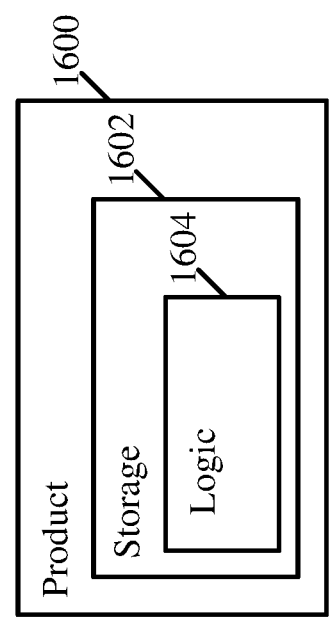
FIG. 16 is a schematic illustration of a product of manufacture, in accordance with some demonstrative embodiments.

Reference is made to FIG. 16, which schematically illustrates a product of manufacture 1600, in accordance with some demonstrative embodiments. Product 1600 may include one or more tangible computer-readable non-transitory storage media 1602, which may include computer-executable instructions, e.g., implemented by logic 1604, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), SC blocking module 127 (FIG. 1), SC blocking module 155 (FIG. 1), Golay sequence generator 129 (FIG. 1), Golay sequence generator 157 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), SC blocking module 127 (FIG. 1), SC blocking module 155 (FIG. 1), Golay sequence generator 129 (FIG. 1), Golay sequence generator 157 (FIG. 1), message processor 128 (FIG. 1), and/or message processor 158 (FIG. 1), to perform one or more operations, and/or to perform, trigger and/or implement one or more operations, communications and/or functionalities described above with reference to FIGS. 1, 2, 3, 4, 5, 6, 7, 8, 9, 10, 11, 12, 13, 14, and/or 15, and/or one or more operations described herein. The phrase "non-transitory machine-readable medium" is directed to include all computer-readable media, with the sole exception being a transitory propagating signal.

In some demonstrative embodiments, product 1600 and/or storage media 1602 may include one or more types of computer-readable storage media capable of storing data, including volatile memory, non-volatile memory, removable or non-removable memory, erasable or non-erasable memory, writeable or re-writeable memory, and the like. For example, machine-readable storage media 1602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1604 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to generate a plurality of Single Carrier (SC) blocks according to a SC block structure corresponding to a Guard Interval (GI) type of a plurality of GI types, a SC block of the plurality of SC blocks comprising a GI followed by a data block, the GI comprising a Golay sequence having a length based at least on the GI type, a length of the data block is based at least on the GI type; and transmit a SC transmission over a millimeter Wave (mmWave) frequency band based on the plurality of SC blocks.

Example 2 includes the subject matter of Example 1, and optionally, wherein for each of the plurality of GI types, a GI of a first SC block in the SC block structure has a same length.

Example 3 includes the subject matter of Example 2, and optionally, wherein the first SC block comprises a GI having a length of 128 samples, and subsequent SC blocks following the first SC block comprise a GI, which has a length based on the GI type.

Example 4 includes the subject matter of Example 1, and optionally, wherein a first SC block of the SC block structure comprises a GI having a length, which is based on the GI type.

Example 5 includes the subject matter of Example 1, and optionally, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

Example 6 includes the subject matter of any one of Examples 1-5, and optionally, wherein the plurality of GI types comprises a long GI, a medium GI, and a short GI.

Example 7 includes the subject matter of Example 6, and optionally, wherein the long GI has a length of 128 samples, the medium GI has a length of 64 samples, and the short GI has a length of 32 samples.

Example 8 includes the subject matter of any one of Examples 1-7, and optionally, wherein the SC transmission is according to a channel bonding factor, a length of the GI and the length of the data block are based on the channel bonding factor.

Example 9 includes the subject matter of Example 8, and optionally, wherein the length of the GI is a product of the channel bonding factor and a GI length without channel bonding, and the length of the date block is a product of the channel bonding factor and a data block length without channel bonding.

Example 10 includes the subject matter of any one of Examples 1-9, and optionally, wherein the GI comprises a Golay sequence of a length of 96, 192 or 384.

Example 11 includes the subject matter of any one of Examples 1-10, and optionally, wherein the SC transmission comprises a Single-Input-Single-Output (SISO) transmission.

Example 12 includes the subject matter of any one of Examples 1-10, and optionally, wherein the SC transmission comprises a Multiple-Input-Multiple-Output (MIMO) transmission.

Example 13 includes the subject matter of Example 12, and optionally, wherein the apparatus is configured to cause the wireless station to generate a plurality of sequences of SC blocks to be transmitted over a plurality of respective streams of the MIMO transmission, a sequence of SC blocks to be transmitted over a stream comprises a GI having a Golay sequence, which is based on a stream number of the stream.

Example 14 includes the subject matter of Example 13, and optionally, wherein the Golay sequence is based on a weight vector, the weight vector is based on the stream number of the stream and on a length of the GI.

Example 15 includes the subject matter of any one of Examples 1-14, and optionally, wherein the SC block structure has a same block size as other SC block structures corresponding to other GI types.

Example 16 includes the subject matter of Example 15, and optionally, wherein the block size comprises a block size of 512 samples.

Example 17 includes the subject matter of any one of Examples 1-16, and optionally, wherein the wireless station is a Directional Multi-Gigabit (DMG) Station (STA).

Example 18 includes the subject matter of any one of Examples 1-17, and optionally, comprising a radio to transmit the SC transmission.

Example 19 includes the subject matter of any one of Examples 1-18, and optionally, comprising one or more antennas, a memory, and a processor.

Example 20 includes a system of wireless communication comprising a wireless station, the wireless station comprising one or more antennas; a radio; a memory; a processor; and a controller configured to cause the wireless station to generate a plurality of Single Carrier (SC) blocks according to a SC block structure corresponding to a Guard Interval (GI) type of a plurality of GI types, a SC block of the plurality of SC blocks comprising a GI followed by a data block, the GI comprising a Golay sequence having a length based at least on the GI type, a length of the data block is based at least on the GI type; and transmit a SC transmission over a millimeter Wave (mmWave) frequency band based on the plurality of SC blocks.

Example 21 includes the subject matter of Example 20, and optionally, wherein for each of the plurality of GI types, a GI of a first SC block in the SC block structure has a same length.

Example 22 includes the subject matter of Example 21, and optionally, wherein the first SC block comprises a GI having a length of 128 samples, and subsequent SC blocks following the first SC block comprise a GI, which has a length based on the GI type.

Example 23 includes the subject matter of Example 20, and optionally, wherein a first SC block of the SC block structure comprises a GI having a length, which is based on the GI type.

Example 24 includes the subject matter of Example 20, and optionally, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

Example 25 includes the subject matter of any one of Examples 20-24, and optionally, wherein the plurality of GI types comprises a long GI, a medium GI, and a short GI.

Example 26 includes the subject matter of Example 25, and optionally, wherein the long GI has a length of 128 samples, the medium GI has a length of 64 samples, and the short GI has a length of 32 samples.

Example 27 includes the subject matter of any one of Examples 20-26, and optionally, wherein the SC transmission is according to a channel bonding factor, a length of the GI and the length of the data block are based on the channel bonding factor.

Example 28 includes the subject matter of Example 27, and optionally, wherein the length of the GI is a product of the channel bonding factor and a GI length without channel bonding, and the length of the date block is a product of the channel bonding factor and a data block length without channel bonding.

Example 29 includes the subject matter of any one of Examples 20-28, and optionally, wherein the GI comprises a Golay sequence of a length of 96, 192 or 384.

Example 30 includes the subject matter of any one of Examples 20-29, and optionally, wherein the SC transmission comprises a Single-Input-Single-Output (SISO) transmission.

Example 31 includes the subject matter of any one of Examples 20-29, and optionally, wherein the SC transmission comprises a Multiple-Input-Multiple-Output (MIMO) transmission.

Example 32 includes the subject matter of Example 31, and optionally, wherein the controller is configured to cause the wireless station to generate a plurality of sequences of SC blocks to be transmitted over a plurality of respective streams of the MIMO transmission, a sequence of SC blocks to be transmitted over a stream comprises a GI having a Golay sequence, which is based on a stream number of the stream.

Example 33 includes the subject matter of Example 32, and optionally, wherein the Golay sequence is based on a weight vector, the weight vector is based on the stream number of the stream and on a length of the GI.

Example 34 includes the subject matter of any one of Examples 20-33, and optionally, wherein the SC block structure has a same block size as other SC block structures corresponding to other GI types.

Example 35 includes the subject matter of Example 34, and optionally, wherein the block size comprises a block size of 512 samples.

Example 36 includes the subject matter of any one of Examples 20-35, and optionally, wherein the wireless station is a Directional Multi-Gigabit (DMG) Station (STA).

Example 37 includes the subject matter of any one of Examples 20-36, and optionally, wherein the radio is to transmit the SC transmission.

Example 38 includes a method to be performed at a wireless station, the method comprising generating a plurality of Single Carrier (SC) blocks according to a SC block structure corresponding to a Guard Interval (GI) type of a plurality of GI types, a SC block of the plurality of SC blocks comprising a GI followed by a data block, the GI comprising a Golay sequence having a length based at least on the GI type, a length of the data block is based at least on the GI type; and transmitting a SC transmission over a millimeter Wave (mmWave) frequency band based on the plurality of SC blocks.

Example 39 includes the subject matter of Example 38, and optionally, wherein for each of the plurality of GI types, a GI of a first SC block in the SC block structure has a same length.

Example 40 includes the subject matter of Example 39, and optionally, wherein the first SC block comprises a GI having a length of 128 samples, and subsequent SC blocks following the first SC block comprise a GI, which has a length based on the GI type.

Example 41 includes the subject matter of Example 38, and optionally, wherein a first SC block of the SC block structure comprises a GI having a length, which is based on the GI type.

Example 42 includes the subject matter of Example 38, and optionally, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

Example 43 includes the subject matter of any one of Examples 38-42, and optionally, wherein the plurality of GI types comprises a long GI, a medium GI, and a short GI.

Example 44 includes the subject matter of Example 43, and optionally, wherein the long GI has a length of 128 samples, the medium GI has a length of 64 samples, and the short GI has a length of 32 samples.

Example 45 includes the subject matter of any one of Examples 38-44, and optionally, wherein the SC transmission is according to a channel bonding factor, a length of the GI and the length of the data block are based on the channel bonding factor.

Example 46 includes the subject matter of Example 45, and optionally, wherein the length of the GI is a product of the channel bonding factor and a GI length without channel bonding, and the length of the date block is a product of the channel bonding factor and a data block length without channel bonding.

Example 47 includes the subject matter of any one of Examples 38-46, and optionally, wherein the GI comprises a Golay sequence of a length of 96, 192 or 384.

Example 48 includes the subject matter of any one of Examples 38-47, and optionally, wherein the SC transmission comprises a Single-Input-Single-Output (SISO) transmission.

Example 49 includes the subject matter of any one of Examples 38-47, and optionally, wherein the SC transmission comprises a Multiple-Input-Multiple-Output (MIMO) transmission.

Example 50 includes the subject matter of Example 49, and optionally, comprising generating a plurality of sequences of SC blocks to be transmitted over a plurality of respective streams of the MIMO transmission, a sequence of SC blocks to be transmitted over a stream comprises a GI having a Golay sequence, which is based on a stream number of the stream.

Example 51 includes the subject matter of Example 50, and optionally, wherein the Golay sequence is based on a weight vector, the weight vector is based on the stream number of the stream and on a length of the GI.

Example 52 includes the subject matter of any one of Examples 38-51, and optionally, wherein the SC block structure has a same block size as other SC block structures corresponding to other GI types.

Example 53 includes the subject matter of Example 52, and optionally, wherein the block size comprises a block size of 512 samples.

Example 54 includes the subject matter of any one of Examples 38-53, and optionally, wherein the wireless station is a Directional Multi-Gigabit (DMG) Station (STA).

Example 55 includes a product comprising one or more tangible computer-readable non-transitory storage media comprising computer-executable instructions operable to, when executed by at least one computer processor, enable the at least one computer processor to cause a wireless station to generate a plurality of Single Carrier (SC) blocks according to a SC block structure corresponding to a Guard Interval (GI) type of a plurality of GI types, a SC block of the plurality of SC blocks comprising a GI followed by a data block, the GI comprising a Golay sequence having a length based at least on the GI type, a length of the data block is based at least on the GI type; and transmit a SC transmission over a millimeter Wave (mmWave) frequency band based on the plurality of SC blocks.

Example 56 includes the subject matter of Example 55, and optionally, wherein for each of the plurality of GI types, a GI of a first SC block in the SC block structure has a same length.

Example 57 includes the subject matter of Example 56, and optionally, wherein the first SC block comprises a GI having a length of 128 samples, and subsequent SC blocks following the first SC block comprise a GI, which has a length based on the GI type.

Example 58 includes the subject matter of Example 55, and optionally, wherein a first SC block of the SC block structure comprises a GI having a length, which is based on the GI type.

Example 59 includes the subject matter of Example 55, and optionally, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

Example 60 includes the subject matter of any one of Examples 55-59, and optionally, wherein the plurality of GI types comprises a long GI, a medium GI, and a short GI.

Example 61 includes the subject matter of Example 60, and optionally, wherein the long GI has a length of 128 samples, the medium GI has a length of 64 samples, and the short GI has a length of 32 samples.

Example 62 includes the subject matter of any one of Examples 55-61, and optionally, wherein the SC transmission is according to a channel bonding factor, a length of the GI and the length of the data block are based on the channel bonding factor.

Example 63 includes the subject matter of Example 62, and optionally, wherein the length of the GI is a product of the channel bonding factor and a GI length without channel bonding, and the length of the date block is a product of the channel bonding factor and a data block length without channel bonding.

Example 64 includes the subject matter of any one of Examples 55-63, and optionally, wherein the GI comprises a Golay sequence of a length of 96, 192 or 384.

Example 65 includes the subject matter of any one of Examples 55-64, and optionally, wherein the SC transmission comprises a Single-Input-Single-Output (SISO) transmission.

Example 66 includes the subject matter of any one of Examples 55-64, and optionally, wherein the SC transmission comprises a Multiple-Input-Multiple-Output (MIMO) transmission.

Example 67 includes the subject matter of Example 66, and optionally, wherein the instructions, when executed, cause the wireless station to generate a plurality of sequences of SC blocks to be transmitted over a plurality of respective streams of the MIMO transmission, a sequence of SC blocks to be transmitted over a stream comprises a GI having a Golay sequence, which is based on a stream number of the stream.

Example 68 includes the subject matter of Example 67, and optionally, wherein the Golay sequence is based on a weight vector, the weight vector is based on the stream number of the stream and on a length of the GI.

Example 69 includes the subject matter of any one of Examples 55-68, and optionally, wherein the SC block structure has a same block size as other SC block structures corresponding to other GI types.

Example 70 includes the subject matter of Example 69, and optionally, wherein the block size comprises a block size of 512 samples.

Example 71 includes the subject matter of any one of Examples 55-70, and optionally, wherein the wireless station is a Directional Multi-Gigabit (DMG) Station (STA).

Example 72 includes an apparatus of wireless communication by a wireless station, the apparatus comprising means for generating a plurality of Single Carrier (SC) blocks according to a SC block structure corresponding to a Guard Interval (GI) type of a plurality of GI types, a SC block of the plurality of SC blocks comprising a GI followed by a data block, the GI comprising a Golay sequence having a length based at least on the GI type, a length of the data block is based at least on the GI type; and means for transmitting a SC transmission over a millimeter Wave (mmWave) frequency band based on the plurality of SC blocks.

Example 73 includes the subject matter of Example 72, and optionally, wherein for each of the plurality of GI types, a GI of a first SC block in the SC block structure has a same length.

Example 74 includes the subject matter of Example 73, and optionally, wherein the first SC block comprises a GI having a length of 128 samples, and subsequent SC blocks following the first SC block comprise a GI, which has a length based on the GI type.

Example 75 includes the subject matter of Example 72, and optionally, wherein a first SC block of the SC block structure comprises a GI having a length, which is based on the GI type.

Example 76 includes the subject matter of Example 72, and optionally, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

Example 77 includes the subject matter of any one of Examples 72-76, and optionally, wherein the plurality of GI types comprises a long GI, a medium GI, and a short GI.

Example 78 includes the subject matter of Example 77, and optionally, wherein the long GI has a length of 128 samples, the medium GI has a length of 64 samples, and the short GI has a length of 32 samples.

Example 79 includes the subject matter of any one of Examples 72-78, and optionally, wherein the SC transmission is according to a channel bonding factor, a length of the GI and the length of the data block are based on the channel bonding factor.

Example 80 includes the subject matter of Example 79, and optionally, wherein the length of the GI is a product of the channel bonding factor and a GI length without channel bonding, and the length of the date block is a product of the channel bonding factor and a data block length without channel bonding.

Example 81 includes the subject matter of any one of Examples 72-80, and optionally, wherein the GI comprises a Golay sequence of a length of 96, 192 or 384.

Example 82 includes the subject matter of any one of Examples 72-81, and optionally, wherein the SC transmission comprises a Single-Input-Single-Output (SISO) transmission.

Example 83 includes the subject matter of any one of Examples 72-81, and optionally, wherein the SC transmission comprises a Multiple-Input-Multiple-Output (MIMO) transmission.

Example 84 includes the subject matter of Example 83, and optionally, comprising means for generating a plurality of sequences of SC blocks to be transmitted over a plurality of respective streams of the MIMO transmission, a sequence of SC blocks to be transmitted over a stream comprises a GI having a Golay sequence, which is based on a stream number of the stream.

Example 85 includes the subject matter of Example 84, and optionally, wherein the Golay sequence is based on a weight vector, the weight vector is based on the stream number of the stream and on a length of the GI.

Example 86 includes the subject matter of any one of Examples 72-85, and optionally, wherein the SC block structure has a same block size as other SC block structures corresponding to other GI types.

Example 87 includes the subject matter of Example 86, and optionally, wherein the block size comprises a block size of 512 samples.

Example 88 includes the subject matter of any one of Examples 72-87, and optionally, wherein the wireless station is a Directional Multi-Gigabit (DMG) Station (STA).

Example 89 includes an apparatus comprising logic and circuitry configured to cause a wireless station to receive a Single Carrier (SC) transmission over a millimeter Wave (mmWave) frequency band; and process the SC transmission based on a plurality of SC blocks according to a SC block structure corresponding to a Guard Interval (GI) type of a plurality of GI types, a SC block of the plurality of SC blocks comprising a GI followed by a data block, the GI comprising a Golay sequence having a length based at least on the GI type, a length of the data block is based at least on the GI type.

Example 90 includes the subject matter of Example 89, and optionally, wherein for each of the plurality of GI types, a GI of a first SC block in the SC block structure has a same length.

Example 91 includes the subject matter of Example 90, and optionally, wherein the first SC block comprises a GI having a length of 128 samples, and subsequent SC blocks following the first SC block comprise a GI, which has a length based on the GI type.

Example 92 includes the subject matter of Example 89, and optionally, wherein a first SC block of the SC block structure comprises a GI having a length, which is based on the GI type.

Example 93 includes the subject matter of Example 89, and optionally, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

Example 94 includes the subject matter of any one of Examples 89-93, and optionally, wherein the plurality of GI types comprises a long GI, a medium GI, and a short GI.

Example 95 includes the subject matter of Example 94, and optionally, wherein the long GI has a length of 128 samples, the medium GI has a length of 64 samples, and the short GI has a length of 32 samples.

Example 96 includes the subject matter of any one of Examples 89-95, and optionally, wherein the SC transmission is according to a channel bonding factor, a length of the GI and the length of the data block are based on the channel bonding factor.

Example 97 includes the subject matter of Example 96, and optionally, wherein the length of the GI is a product of the channel bonding factor and a GI length without channel bonding, and the length of the date block is a product of the channel bonding factor and a data block length without channel bonding.

Example 98 includes the subject matter of any one of Examples 89-97, and optionally, wherein the GI comprises a Golay sequence of a length of 96, 192 or 384.

Example 99 includes the subject matter of any one of Examples 89-98, and optionally, wherein the SC transmission comprises a Single-Input-Single-Output (SISO) transmission.

Example 100 includes the subject matter of any one of Examples 89-98, and optionally, wherein the SC transmission comprises a Multiple-Input-Multiple-Output (MIMO) transmission.

Example 101 includes the subject matter of Example 100, and optionally, wherein the apparatus is configured to cause the wireless station to process one or more sequences of SC blocks received over a one or more respective streams of the MIMO transmission, a sequence of SC blocks to be received over a stream to be processed based on a GI having a Golay sequence, which is based on a stream number of the stream.

Example 102 includes the subject matter of Example 101, and optionally, wherein the Golay sequence is based on a weight vector, the weight vector is based on the stream number of the stream and on a length of the GI.

Example 103 includes the subject matter of any one of Examples 89-102, and optionally, wherein the SC block structure has a same block size as other SC block structures corresponding to other GI types.

Example 104 includes the subject matter of Example 103, and optionally, wherein the block size comprises a block size of 512 samples.

Example 105 includes the subject matter of any one of Examples 89-104, and optionally, wherein the wireless station is a Directional Multi-Gigabit (DMG) Station (STA).

Example 106 includes the subject matter of any one of Examples 89-105, and optionally, comprising a radio to receive the SC transmission.

Example 107 includes the subject matter of any one of Examples 89-106, and optionally, comprising one or more antennas, a memory, and a processor.

Example 108 includes a system of wireless communication comprising a wireless station, the wireless station comprising one or more antennas; a radio; a memory; a processor; and a controller configured to cause the wireless station to receive a Single Carrier (SC) transmission over a millimeter Wave (mmWave) frequency band; and process the SC transmission based on a plurality of SC blocks according to a SC block structure corresponding to a Guard Interval (GI) type of a plurality of GI types, a SC block of the plurality of SC blocks comprising a GI followed by a data block, the GI comprising a Golay sequence having a length based at least on the GI type, a length of the data block is based at least on the GI type.

Example 109 includes the subject matter of Example 108, and optionally, wherein for each of the plurality of GI types, a GI of a first SC block in the SC block structure has a same length.

Example 110 includes the subject matter of Example 109, and optionally, wherein the first SC block comprises a GI having a length of 128 samples, and subsequent SC blocks following the first SC block comprise a GI, which has a length based on the GI type.

Example 111 includes the subject matter of Example 108, and optionally, wherein a first SC block of the SC block structure comprises a GI having a length, which is based on the GI type.

Example 112 includes the subject matter of Example 108, and optionally, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

Example 113 includes the subject matter of any one of Examples 108-112, and optionally, wherein the plurality of GI types comprises a long GI, a medium GI, and a short GI.

Example 114 includes the subject matter of Example 113, and optionally, wherein the long GI has a length of 128 samples, the medium GI has a length of 64 samples, and the short GI has a length of 32 samples.

Example 115 includes the subject matter of any one of Examples 108-114, and optionally, wherein the SC transmission is according to a channel bonding factor, a length of the GI and the length of the data block are based on the channel bonding factor.

Example 116 includes the subject matter of Example 115, and optionally, wherein the length of the GI is a product of the channel bonding factor and a GI length without channel bonding, and the length of the date block is a product of the channel bonding factor and a data block length without channel bonding.

Example 117 includes the subject matter of any one of Examples 108-116, and optionally, wherein the GI comprises a Golay sequence of a length of 96, 192 or 384.

Example 118 includes the subject matter of any one of Examples 108-117, and optionally, wherein the SC transmission comprises a Single-Input-Single-Output (SISO) transmission.

Example 119 includes the subject matter of any one of Examples 108-117, and optionally, wherein the SC transmission comprises a Multiple-Input-Multiple-Output (MIMO) transmission.

Example 120 includes the subject matter of Example 119, and optionally, wherein the controller is configured to cause the wireless station to process one or more sequences of SC blocks received over a one or more respective streams of the MIMO transmission, a sequence of SC blocks to be received over a stream to be processed based on a GI having a Golay sequence, which is based on a stream number of the stream.

Example 121 includes the subject matter of Example 120, and optionally, wherein the Golay sequence is based on a weight vector, the weight vector is based on the stream number of the stream and on a length of the GI.

Example 122 includes the subject matter of any one of Examples 108-121, and optionally, wherein the SC block structure has a same block size as other SC block structures corresponding to other GI types.

Example 123 includes the subject matter of Example 122, and optionally, wherein the block size comprises a block size of 512 samples.

Example 124 includes the subject matter of any one of Examples 108-123, and optionally, wherein the wireless station is a Directional Multi-Gigabit (DMG) Station (STA).

Example 125 includes the subject matter of any one of Examples 108-124, and optionally, wherein the radio is to receive the SC transmission.

Example 126 includes a method to be performed at a wireless station, the method comprising receiving a Single Carrier (SC) transmission over a millimeter Wave (mmWave) frequency band; and processing the SC transmission based on a plurality of SC blocks according to a SC block structure corresponding to a Guard Interval (GI) type of a plurality of GI types, a SC block of the plurality of SC blocks comprising a GI followed by a data block, the GI comprising a Golay sequence having a length based at least on the GI type, a length of the data block is based at least on the GI type.

Example 127 includes the subject matter of Example 126, and optionally, wherein for each of the plurality of GI types, a GI of a first SC block in the SC block structure has a same length.

Example 128 includes the subject matter of Example 127, and optionally, wherein the first SC block comprises a GI having a length of 128 samples, and subsequent SC blocks following the first SC block comprise a GI, which has a length based on the GI type.

Example 129 includes the subject matter of Example 126, and optionally, wherein a first SC block of the SC block structure comprises a GI having a length, which is based on the GI type.

Example 130 includes the subject matter of Example 126, and optionally, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

Example 131 includes the subject matter of any one of Examples 126-130, and optionally, wherein the plurality of GI types comprises a long GI, a medium GI, and a short GI.

Example 132 includes the subject matter of Example 131, and optionally, wherein the long GI has a length of 128 samples, the medium GI has a length of 64 samples, and the short GI has a length of 32 samples.

Example 133 includes the subject matter of any one of Examples 126-132, and optionally, wherein the SC transmission is according to a channel bonding factor, a length of the GI and the length of the data block are based on the channel bonding factor.

Example 134 includes the subject matter of Example 133, and optionally, wherein the length of the GI is a product of the channel bonding factor and a GI length without channel bonding, and the length of the date block is a product of the channel bonding factor and a data block length without channel bonding.

Example 135 includes the subject matter of any one of Examples 126-134, and optionally, wherein the GI comprises a Golay sequence of a length of 96, 192 or 384.

Example 136 includes the subject matter of any one of Examples 126-135, and optionally, wherein the SC transmission comprises a Single-Input-Single-Output (SISO) transmission.

Example 137 includes the subject matter of any one of Examples 126-135, and optionally, wherein the SC transmission comprises a Multiple-Input-Multiple-Output (MIMO) transmission.

Example 138 includes the subject matter of Example 137, and optionally, comprising processing one or more sequences of SC blocks received over a one or more respective streams of the MIMO transmission, a sequence of SC blocks to be received over a stream to be processed based on a GI having a Golay sequence, which is based on a stream number of the stream.

Example 139 includes the subject matter of Example 138, and optionally, wherein the Golay sequence is based on a weight vector, the weight vector is based on the stream number of the stream and on a length of the GI.

Example 140 includes the subject matter of any one of Examples 126-139, and optionally, wherein the SC block structure has a same block size as other SC block structures corresponding to other GI types.

Example 141 includes the subject matter of Example 140, and optionally, wherein the block size comprises a block size of 512 samples.

Example 142 includes the subject matter of any one of Examples 126-141, and optionally, wherein the wireless station is a Directional Multi-Gigabit (DMG) Station (STA).

Example 143 includes a product comprising one or more tangible computer-readable non-transitory storage media comprising computer-executable instructions operable to, when executed by at least one computer processor, enable the at least one computer processor to cause a wireless station to receive a Single Carrier (SC) transmission over a millimeter Wave (mmWave) frequency band; and process the SC transmission based on a plurality of SC blocks according to a SC block structure corresponding to a Guard Interval (GI) type of a plurality of GI types, a SC block of the plurality of SC blocks comprising a GI followed by a data block, the GI comprising a Golay sequence having a length based at least on the GI type, a length of the data block is based at least on the GI type.

Example 144 includes the subject matter of Example 143, and optionally, wherein for each of the plurality of GI types, a GI of a first SC block in the SC block structure has a same length.

Example 145 includes the subject matter of Example 144, and optionally, wherein the first SC block comprises a GI having a length of 128 samples, and subsequent SC blocks following the first SC block comprise a GI, which has a length based on the GI type.

Example 146 includes the subject matter of Example 143, and optionally, wherein a first SC block of the SC block structure comprises a GI having a length, which is based on the GI type.

Example 147 includes the subject matter of Example 143, and optionally, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

Example 148 includes the subject matter of any one of Examples 143-147, and optionally, wherein the plurality of GI types comprises a long GI, a medium GI, and a short GI.

Example 149 includes the subject matter of Example 148, and optionally, wherein the long GI has a length of 128 samples, the medium GI has a length of 64 samples, and the short GI has a length of 32 samples.

Example 150 includes the subject matter of any one of Examples 143-149, and optionally, wherein the SC transmission is according to a channel bonding factor, a length of the GI and the length of the data block are based on the channel bonding factor.

Example 151 includes the subject matter of Example 150, and optionally, wherein the length of the GI is a product of the channel bonding factor and a GI length without channel bonding, and the length of the date block is a product of the channel bonding factor and a data block length without channel bonding.

Example 152 includes the subject matter of any one of Examples 143-151, and optionally, wherein the GI comprises a Golay sequence of a length of 96, 192 or 384.

Example 153 includes the subject matter of any one of Examples 143-152, and optionally, wherein the SC transmission comprises a Single-Input-Single-Output (SISO) transmission.

Example 154 includes the subject matter of any one of Examples 143-152, and optionally, wherein the SC transmission comprises a Multiple-Input-Multiple-Output (MIMO) transmission.

Example 155 includes the subject matter of Example 154, and optionally, wherein the instructions, when executed, cause the wireless station to process one or more sequences of SC blocks received over a one or more respective streams of the MIMO transmission, a sequence of SC blocks to be received over a stream to be processed based on a GI having a Golay sequence, which is based on a stream number of the stream.

Example 156 includes the subject matter of Example 155, and optionally, wherein the Golay sequence is based on a weight vector, the weight vector is based on the stream number of the stream and on a length of the GI.

Example 157 includes the subject matter of any one of Examples 143-156, and optionally, wherein the SC block structure has a same block size as other SC block structures corresponding to other GI types.

Example 158 includes the subject matter of Example 157, and optionally, wherein the block size comprises a block size of 512 samples.

Example 159 includes the subject matter of any one of Examples 143-158, and optionally, wherein the wireless station is a Directional Multi-Gigabit (DMG) Station (STA).

Example 160 includes an apparatus of wireless communication by a wireless station, the apparatus comprising means for receiving a Single Carrier (SC) transmission over a millimeter Wave (mmWave) frequency band; and means for processing the SC transmission based on a plurality of SC blocks according to a SC block structure corresponding to a Guard Interval (GI) type of a plurality of GI types, a SC block of the plurality of SC blocks comprising a GI followed by a data block, the GI comprising a Golay sequence having a length based at least on the GI type, a length of the data block is based at least on the GI type.

Example 161 includes the subject matter of Example 160, and optionally, wherein for each of the plurality of GI types, a GI of a first SC block in the SC block structure has a same length.

Example 162 includes the subject matter of Example 161, and optionally, wherein the first SC block comprises a GI having a length of 128 samples, and subsequent SC blocks following the first SC block comprise a GI, which has a length based on the GI type.

Example 163 includes the subject matter of Example 160, and optionally, wherein a first SC block of the SC block structure comprises a GI having a length, which is based on the GI type.

Example 164 includes the subject matter of Example 160, and optionally, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

Example 165 includes the subject matter of any one of Examples 160-164, and optionally, wherein the plurality of GI types comprises a long GI, a medium GI, and a short GI.

Example 166 includes the subject matter of Example 165, and optionally, wherein the long GI has a length of 128 samples, the medium GI has a length of 64 samples, and the short GI has a length of 32 samples.

Example 167 includes the subject matter of any one of Examples 160-166, and optionally, wherein the SC transmission is according to a channel bonding factor, a length of the GI and the length of the data block are based on the channel bonding factor.

Example 168 includes the subject matter of Example 167, and optionally, wherein the length of the GI is a product of the channel bonding factor and a GI length without channel bonding, and the length of the date block is a product of the channel bonding factor and a data block length without channel bonding.

Example 169 includes the subject matter of any one of Examples 160-168, and optionally, wherein the GI comprises a Golay sequence of a length of 96, 192 or 384.

Example 170 includes the subject matter of any one of Examples 160-169, and optionally, wherein the SC transmission comprises a Single-Input-Single-Output (SISO) transmission.

Example 171 includes the subject matter of any one of Examples 160-169, and optionally, wherein the SC transmission comprises a Multiple-Input-Multiple-Output (MIMO) transmission.

Example 172 includes the subject matter of Example 171, and optionally, comprising means for processing one or more sequences of SC blocks received over a one or more respective streams of the MIMO transmission, a sequence of SC blocks to be received over a stream to be processed based on a GI having a Golay sequence, which is based on a stream number of the stream.

Example 173 includes the subject matter of Example 172, and optionally, wherein the Golay sequence is based on a weight vector, the weight vector is based on the stream number of the stream and on a length of the GI.

Example 174 includes the subject matter of any one of Examples 160-173, and optionally, wherein the SC block structure has a same block size as other SC block structures corresponding to other GI types.

Example 175 includes the subject matter of Example 174, and optionally, wherein the block size comprises a block size of 512 samples.

Example 176 includes the subject matter of any one of Examples 160-175, and optionally, wherein the wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless station to:
   generate a plurality of sequences of Single Carrier (SC) blocks for a plurality of space-time streams according to a SC block structure configured to support at least one of channel bonding or Multiple-Input-Multiple-Output (MIMO) communication over a millimeter Wave (mmWave) frequency band, the SC block structure corresponding to a Guard Interval (GI) type of a plurality of GI types, the SC block structure configured to differentiate between the plurality of space-time streams using a plurality of different GIs for the plurality of space-time streams, respectively, a SC block in a sequence of SC blocks of the plurality of sequences of SC blocks comprising a GI followed by a data block, the GI comprising a Golay sequence having a length based at least on the GI type, the Golay sequence is based on a space-time stream number of a space-time stream for transmission of the SC block comprising the GI, a length of the data block is based at least on the GI type; and
   transmit a SC transmission comprising the plurality of space-time streams over the mmWave frequency band based on the plurality of sequences of SC blocks.

2. The apparatus of claim 1, wherein for each of the plurality of GI types, a GI of a first SC block in the SC block structure has a same length.

3. The apparatus of claim 2, wherein the first SC block comprises a GI having a length of 128 samples, and subsequent SC blocks following the first SC block comprise a GI, which has a length based on the GI type.

4. The apparatus of claim 1, wherein a first SC block of the SC block structure comprises a GI having a length, which is based on the GI type.

5. The apparatus of claim 1, wherein a length of a GI of a first SC block of the SC block structure is based on the GI type corresponding to the SC block structure, and wherein centers of data blocks and centers of GIs of subsequent SC blocks are aligned between a plurality of SC block structures corresponding to the plurality of GI types.

6. The apparatus of claim 1, wherein the plurality of GI types comprises a long GI, a medium GI, and a short GI.

7. The apparatus of claim 6, wherein the long GI has a length of 128 samples, the medium GI has a length of 64 samples, and the short GI has a length of 32 samples.

8. The apparatus of claim 1, wherein the SC transmission is according to a channel bonding factor, a length of the GI and the length of the data block are based on the channel bonding factor.

9. The apparatus of claim 8, wherein the length of the GI is a product of the channel bonding factor and a GI length without channel bonding, and the length of the data block is a product of the channel bonding factor and a data block length without channel bonding.

10. The apparatus of claim 1, wherein the SC transmission comprises a MIMO transmission.

11. The apparatus of claim 10 configured to cause the wireless station to generate the plurality of sequences of SC blocks to be transmitted over a plurality of respective space-time streams of the MIMO transmission.

12. The apparatus of claim 1, wherein the Golay sequence is based on a weight vector, the weight vector is based on the space-time stream number of the space-time stream and on a length of the GI.

13. The apparatus of claim 1, wherein the wireless station is a Directional Multi-Gigabit (DMG) Station (STA).

14. The apparatus of claim 1 comprising a radio to transmit the SC transmission.

15. The apparatus of claim 1 comprising one or more antennas, a memory, and a processor.

16. A product comprising one or more tangible computer-readable non-transitory storage media comprising computer-executable instructions operable to, when executed by at least one processor, enable the at least one processor to cause a wireless station to:
   generate a plurality of sequences of Single Carrier (SC) blocks for a plurality of space-time streams according to a SC block structure configured to support at least one of channel bonding or Multiple-Input-Multiple-Output (MIMO) communication over a millimeter Wave (mmWave) frequency band, the SC block structure corresponding to a Guard Interval (GI) type of a plurality of GI types, the SC block structure configured to differentiate between the plurality of space-time streams using a plurality of different GIs for the plurality of space-time streams, respectively, a SC block in a sequence of SC blocks of the plurality of sequences of SC blocks comprising a GI followed by a data block, the GI comprising a Golay sequence having a length based at least on the GI type, the Golay sequence is based on a space-time stream number of a space-time stream for transmission of the SC block comprising the GI, a length of the data block is based at least on the GI type; and
   transmit a SC transmission comprising the plurality of space-time streams over the mmWave frequency band based on the plurality of sequences of SC blocks.

17. The product of claim 16, wherein a first SC block of the SC block structure comprises a GI having a length, which is based on the GI type.

18. The product of claim 16, wherein the plurality of GI types comprises a long GI, a medium GI, and a short GI.

19. The product of claim 18, wherein the long GI has a length of 128 samples, the medium GI has a length of 64 samples, and the short GI has a length of 32 samples.

20. The product of claim 16, wherein the SC transmission is according to a channel bonding factor, a length of the GI and the length of the data block are based on the channel bonding factor.

21. The product of claim 20, wherein the length of the GI is a product of the channel bonding factor and a GI length without channel bonding, and the length of the data block is a product of the channel bonding factor and a data block length without channel bonding.

22. The product of claim 16, wherein the Golay sequence is based on a weight vector, the weight vector is based on the space-time stream number of the space-time stream and on a length of the GI.

\* \* \* \* \*